(12) United States Patent
Mizusaki et al.

(10) Patent No.: US 10,545,382 B2
(45) Date of Patent: Jan. 28, 2020

(54) LIQUID CRYSTAL DISPLAY DEVICE AND ALIGNMENT FILM

(71) Applicant: SHARP KABUSHIKI KAISHA, Sakai, Osaka (JP)

(72) Inventors: Masanobu Mizusaki, Sakai (JP); Hiroshi Tsuchiya, Sakai (JP)

(73) Assignee: SHARP KABUSHIKI KAISHA, Sakai, Osaka (JP)

( * ) Notice: Subject to any disclaimer, the term of this patent is extended or adjusted under 35 U.S.C. 154(b) by 71 days.

(21) Appl. No.: 15/576,993

(22) PCT Filed: May 23, 2016

(86) PCT No.: PCT/JP2016/065114
§ 371 (c)(1),
(2) Date: Nov. 27, 2017

(87) PCT Pub. No.: WO2016/194667
PCT Pub. Date: Dec. 8, 2016

(65) Prior Publication Data
US 2018/0149927 A1    May 31, 2018

(30) Foreign Application Priority Data
May 29, 2015    (JP) ................. 2015-110248

(51) Int. Cl.
| G02F 1/1337 | (2006.01) |
| G02F 1/1368 | (2006.01) |
| G02F 1/1334 | (2006.01) |
| G02F 1/1343 | (2006.01) |

(52) U.S. Cl.
CPC ...... *G02F 1/133711* (2013.01); *G02F 1/1334* (2013.01); *G02F 1/1343* (2013.01); *G02F 1/1368* (2013.01); *G02F 1/133719* (2013.01); *G02F 1/133723* (2013.01);
(Continued)

(58) Field of Classification Search
CPC .... G02F 1/1334; G02F 1/1343; G02F 1/1368; G02F 1/133711; G02F 1/133719; G02F 1/133723; G02F 2001/133742; C09K 19/02; C09K 19/348; C09K 19/54;
(Continued)

(56) References Cited

U.S. PATENT DOCUMENTS

2007/0058101 A1*  3/2007  Kawasaki ......... G02F 1/133784
                                                          349/43
2016/0087208 A1*  3/2016  Matsushita ............ C07F 9/145
                                                          524/516

FOREIGN PATENT DOCUMENTS

JP        2004-053914 A      2/2004
WO    WO-2014196482 A1 * 12/2014 ............. C08L 33/14

* cited by examiner

*Primary Examiner* — Sophie Hon
(74) *Attorney, Agent, or Firm* — ScienBizP, P.C.

(57) ABSTRACT

The present disclosure provides a liquid crystal display device that can maintain a high voltage holding ratio for extended periods and can ensure reliability. A liquid crystal display device according to the present disclosure includes a pair of opposing substrates, a liquid crystal layer between the pair of substrates, and an alignment film between at least one of the pair of substrates and the liquid crystal layer. At least one of the pair of substrates has an electrode and/or wire containing copper or aluminum. The alignment film contains a polymer with a chemical structure on a side chain of the polymer, the chemical structure having a benzotriazole group represented by a specific chemical formula.

13 Claims, 1 Drawing Sheet

(52) U.S. Cl.
CPC .............. *G02F 2001/133742* (2013.01); *Y10T 428/1005* (2015.01); *Y10T 428/1014* (2015.01); *Y10T 428/1023* (2015.01)

(58) Field of Classification Search
CPC .............. C09K 19/56; C09K 2019/548; Y10T 428/1005; Y10T 428/1014; Y10T 428/1023
See application file for complete search history.

LIQUID CRYSTAL DISPLAY DEVICE AND ALIGNMENT FILM

TECHNICAL FIELD

The present disclosure relates to a liquid crystal display device and an alignment film. More particularly, the present disclosure relates to a liquid crystal display device with an alignment film and to an alignment film that controls the alignment of liquid crystal molecules.

BACKGROUND ART

Due to their thin, light-weight, and low power consumption characteristics, liquid crystal display devices are utilized in smartphones, tablet PCs, and car navigation systems, as well as in television sets. These applications require various performance attributes. For example, high performance is required for an alignment film, which is a component of a liquid crystal display device. Thus, a liquid crystal display device is proposed in which a light stabilizer is added to an alignment film (see Patent Literature 1, for example).

CITATION LIST

Patent Literature

PTL 1: Japanese Unexamined Patent Application Publication No. 2004-53914

SUMMARY OF INVENTION

Technical Problem

In known liquid crystal display devices, however, an electrode and/or wire containing copper or aluminum sometimes causes image sticking after long-term use and reduces reliability. The present inventors have investigated the cause and found that image sticking occurs through the following two routes. In the following description, the electrode and/or wire contains copper, but the description is applicable to an electrode and/or wire containing aluminum.

[Route 1]
(1-1) Water Infiltration

Water infiltrates into a liquid crystal display device through a sealing material and through the interface between a sealing material and an a alignment film.

(1-2) Generation of Copper Ions

In general, electrodes and/or wires are in contact with an alignment film (organic film). Thus, water that infiltrates into a liquid crystal display device comes into contact with an electrode and/or wire through an alignment film. When an electrode and/or wire is in contact with an interlayer insulating film (organic film), water may come into contact with the electrode and/or wire through the interlayer insulating film. Consequently, water ionizes copper in the electrode and/or wire and finally, together with copper ions ($Cu^{2+}$ and $Cu^{3+}$), infiltrates into a liquid crystal layer. In the liquid crystal layer, liquid crystal molecules with negative dielectric constant anisotropy (hereinafter also referred to as a negative liquid crystal) absorb more water than liquid crystal molecules with positive dielectric constant anisotropy (hereinafter also referred to as a positive liquid crystal). Thus, negative liquid crystals tend to absorb more copper ions than positive liquid crystals. This is because negative liquid crystals have higher polarity than positive liquid crystals. Negative liquid crystals contain a larger amount of highly-polar oxygen (—O—), fluorine (—F), and chlorine (—Cl) in liquid crystal molecules than positive liquid crystals and contain fluorine and an alkoxy group containing oxygen in the same liquid crystal molecule. Thus, negative liquid crystals have high polarity.

(1-3) Generation of Radicals

As shown in the following formulae (A-1) and (A-2), heat or light causes a redox reaction between copper ions and a carboxylic acid (carboxy group) of a polymer (for example, poly(amic acid)) contained in an alignment film and thereby generates radicals in the alignment film.

[Chem. 1]

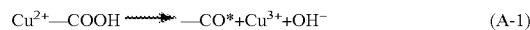
$$Cu^{2+}—COOH \longrightarrow —CO^{*}+Cu^{3+}+OH^{-} \quad (A-1)$$

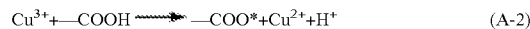
$$Cu^{3+}+—COOH \longrightarrow —COO^{*}+Cu^{2+}+H^{+} \quad (A-2)$$

(1-4) Occurrence of Image Sticking

Radicals in the alignment film move to a liquid crystal layer and are ionized by electron transfer. This increases the ion density of the liquid crystal layer and decreases the voltage holding ratio (VHR), thereby causing image sticking.

[Route 2]
(2-1) Water Infiltration

Water infiltrates into a liquid crystal display device through a sealing material and through the interface between a sealing material and an alignment film.

(2-2) Generation of Copper Ions

Water that infiltrates into a liquid crystal display device comes into contact with an electrode and/or wire through an alignment film. Water may also come into contact with an electrode and/or wire through an interlayer insulating film. Consequently, water ionizes copper in the electrode and/or wire and finally, together with copper ions ($Cu^{2+}$ and $Cu^{3+}$), infiltrates into a liquid crystal layer.

(2-3) Formation of Carboxylic Acid

Water hydrolyzes a functional group (ester group) between a main chain and a side chain of a polymer (for example, poly(amic acid)) in an alignment film, thereby forming a carboxylic acid. An example of the reaction is represented by the following formula (B).

[Chem. 2]

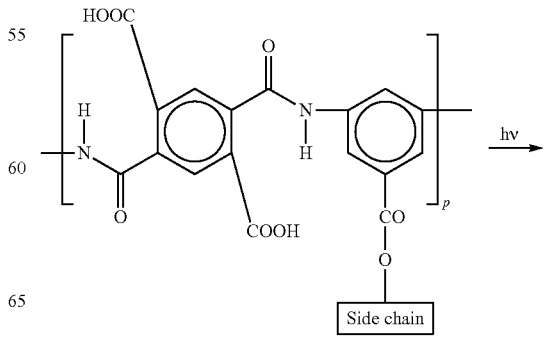

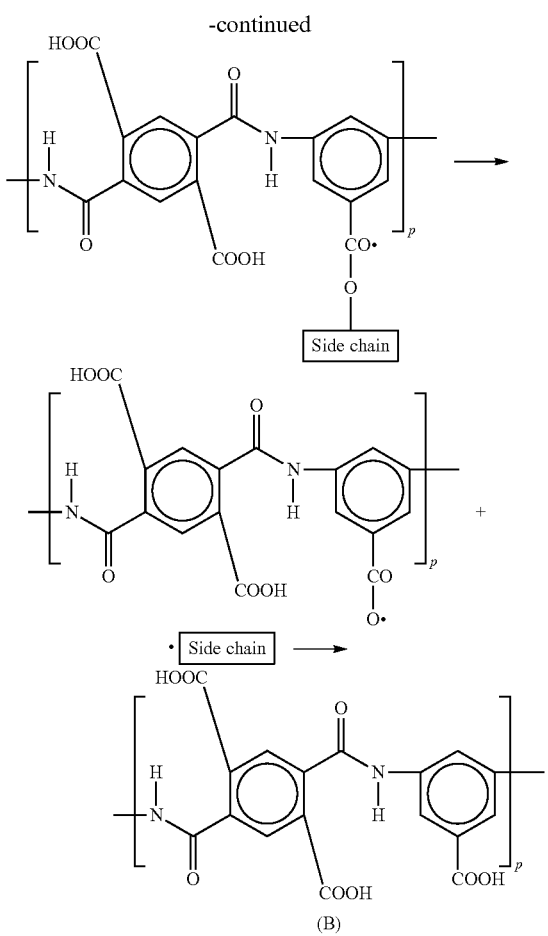

(B)

In the formula (B), p denotes an integer of 1 or more.

(2-4) Generation of Radicals

As shown in the formulae (A-1) and (A-2), heat or light causes a redox reaction between copper ions and a carboxylic acid (carboxy group) of a polymer contained in an alignment film and thereby generates radicals in the alignment film.

(2-5) Occurrence of Image Sticking

Radicals in the alignment film move to a liquid crystal layer and are ionized by electron transfer. This increases the ion density of the liquid crystal layer and decreases the voltage holding ratio, thereby causing image sticking.

Patent Literature 1 discloses a liquid crystal display device including an alignment film to which a light stabilizer is added. In the invention described in Patent Literature 1, however, the light stabilizer is used for optical absorption (ultraviolet absorption) and not to reduce the generation of radicals by a redox reaction as described above. Furthermore, the light stabilizer has a low molecular weight (an average molecular weight in the range of 250 to 3000) and is therefore easily eluted into a liquid crystal layer, thereby decreasing the voltage holding ratio.

In view of such situations, the present disclosure provides a liquid crystal display device that can maintain a high voltage holding ratio for extended periods and can ensure reliability, and an alignment film.

Solution to Problem

The present inventors have studied a liquid crystal display device that can maintain a high voltage holding ratio for extended periods and can ensure reliability. The present inventors have focused on the suppression of a redox reaction between copper ions (aluminum ions) and a carboxylic acid of a polymer contained in an alignment film, as described above. The present inventors have found that a chemical structure with a benzotriazole group on a side chain of a polymer contained in an alignment film enables the formation of a complex between copper ions (aluminum ions) and the benzotriazole group and can thereby suppress a redox reaction. This can suppress the degeneration of radicals in the alignment film, the generation of ions derived from radicals in a liquid crystal layer, and the decrease in voltage holding ratio. Thus, the present inventors considered that these can successfully solve the problems described above and arrived at the present disclosure.

Thus, one aspect of the present disclosure may be a liquid crystal display device that includes a pair of opposing substrates, a liquid crystal layer between the pair of substrates, and an alignment film between at least one of the pair of substrates and the liquid crystal layer. At least one of the pair of substrates has an electrode and/or wire containing copper or aluminum. The alignment film contains a polymer with a chemical structure on a side chain of the polymer, the chemical structure having a benzotriazole group represented by the following chemical formula (1).

[Chem. 3]

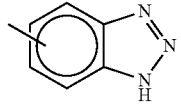

(1)

Another aspect of the present disclosure may be an alignment film containing a polymer with a chemical structure on a side chain of the polymer, the chemical structure having a benzotriazole group represented by the following chemical formula (1).

[Chem. 4]

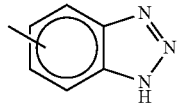

(1)

Advantageous Effects of Invention

The present disclosure can provide a liquid crystal display device that can maintain a high voltage holding ratio for extended periods and can ensure reliability, and an alignment film.

DESCRIPTION OF EMBODIMENTS

Although the present disclosure will be further described in the following embodiments with reference to the accompanying drawings, the present disclosure is not limited to these embodiments. These embodiments may be combined or modified if necessary without departing from the gist of the present disclosure.

Embodiments

Figure 1:
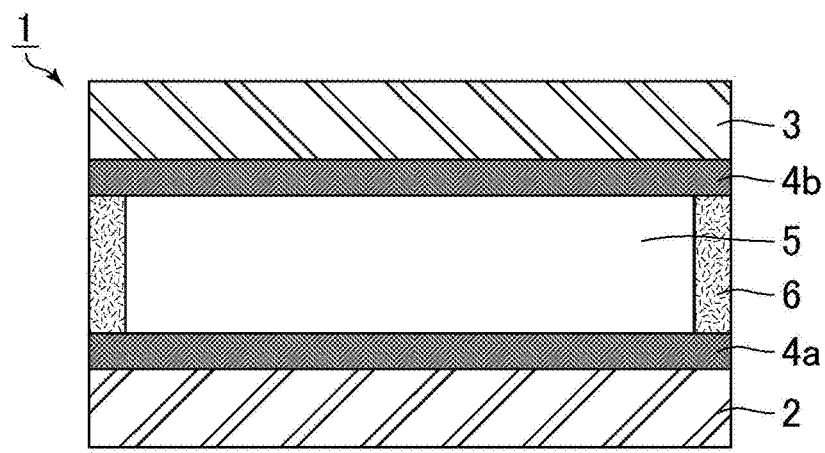
FIG. 1 is a schematic cross-sectional view of a liquid crystal display device according to an embodiment of the present disclosure.

FIG. 1 is a schematic cross-sectional view of a liquid crystal display device according to an embodiment of the present disclosure. As illustrated in FIG. 1, a liquid crystal display device 1 includes a lower substrate 2, an upper substrate 3 facing the lower substrate 2, a liquid crystal layer 5 between the substrates, an alignment film 4a, an alignment film 4b, and a sealing material 6. The alignment film 4a is disposed between the lower substrate 2 and the liquid crystal layer 5. The alignment film 4b is disposed between the upper substrate 3 and the liquid crystal layer 5. The sealing material 6 surrounds the liquid crystal layer 5. The liquid crystal display device 1 may include a backlight and may include a pair of polarizing plates on the lower substrate 2 and the upper substrate 3 opposite the liquid crystal layer 5.

At least one of the lower substrate 2 and the upper substrate 3 includes an electrode and/or wire containing copper or aluminum. Such a substrate including an electrode and wire may be a thin-film transistor array substrate. The structure of a thin-film transistor array substrate will be described below with reference to FIGS. 2 and 3. In this embodiment, the lower substrate 2 is a thin-film transistor array substrate.

Figure 2:
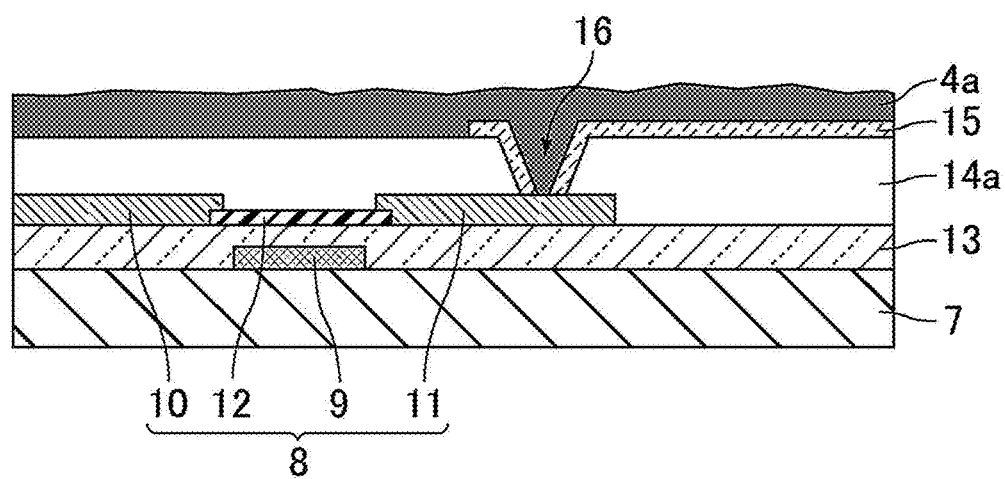
FIG. 2 is a schematic cross-sectional view of the structure of a thin-film transistor array substrate.

FIG. 2 is a schematic cross-sectional view of the structure of the thin-film transistor array substrate. As illustrated in FIG. 2, the thin-film transistor array substrate includes a transparent substrate 7, a thin-film transistor device 8, a gate-insulating film 13, an interlayer insulating film 14a, and a pixel electrode 15. The thin-film transistor device 8 includes a gate electrode 9, a source electrode 10, a drain electrode 11, and a semiconductor layer 12. The semiconductor layer 12 is electrically connected to the source electrode 10 and the drain electrode 11. The gate electrode 9 is disposed on the transparent substrate 7. The gate-insulating film 13 covers the gate electrode 9. The source electrode 10, the drain electrode 11, and the semiconductor layer 12 are disposed on the gate-insulating film 13. The interlayer insulating film 14a covers the source electrode 10, the drain electrode 11, and the semiconductor layer 12 and has a contact hole 16. The pixel electrode 15 is disposed on the interlayer insulating film 14a and is electrically connected to the drain electrode 11 through the contact hole 16. The thin-film transistor array substrate further includes wires, such as a gate bus line electrically connected to the gate electrode 9 and a source bus line electrically connected to the source electrode 10.

Figure 3:
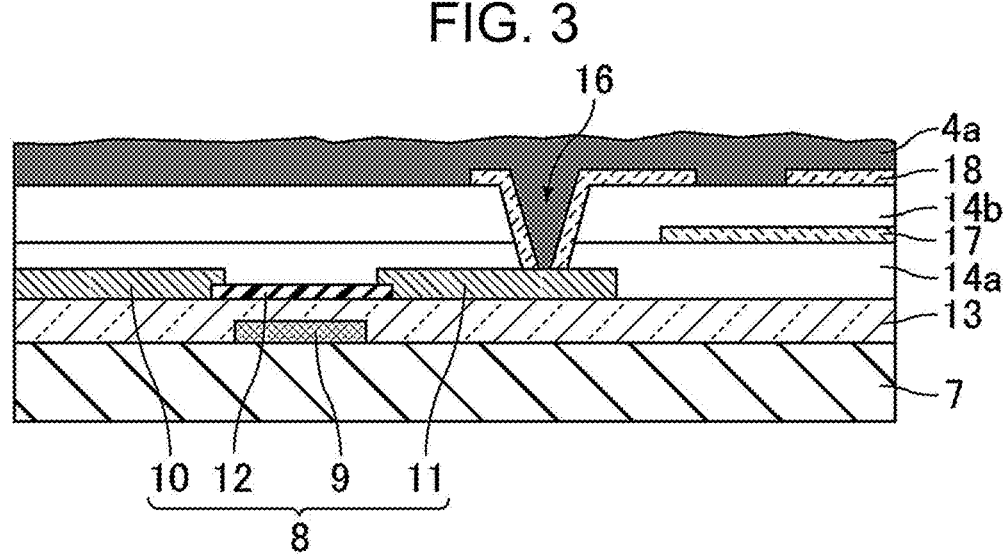
FIG. 3 is a schematic cross-sectional view of the structure of a thin-film transistor array substrate, which is different from the structure illustrated in FIG. 2.

FIG. 3 is a schematic cross-sectional view of the structure of a thin-film transistor array substrate, which is different from the structure illustrated in FIG. 2. Except its 2-layer electrode structure, the thin-film transistor array substrate illustrated in FIG. 3 is the same as the thin-film transistor array substrate illustrated in FIG. 2. Thus, the items described above are appropriately omitted to avoid overlap. As illustrated in FIG. 3, a lower electrode 17 is disposed on the interlayer insulating film 14a. An interlayer insulating film 14b covers the lower electrode 17 and has the contact hole 16. An upper electrode 18 is disposed on the interlayer insulating film 14a and the interlayer insulating film 14b and is electrically connected to the drain electrode 11 through the contact hole 16.

The transparent substrate 7 may be a glass substrate or a plastic substrate.

At least one of the gate electrode 9, the source electrode 10, the drain electrode 11, and wires (such as a gate bus line and a source bus line) contains copper or aluminum. Copper and aluminum have high electric conductivity enough to reduce capacitance load in liquid crystal display devices. Thus, copper and aluminum can be suitable for the material of an electrode and/or wire in high-definition (for example, at least full high definition), large-sized (for example, 10 inches or more) liquid crystal display devices. The source electrode 10 is in direct contact with the interlayer insulating film 14a. The drain electrode 11 is in direct contact with both the interlayer insulating film 14a and the alignment film 4a.

The semiconductor layer 12 may contain amorphous silicon, low-temperature polysilicon, or an oxide semiconductor, preferably an oxide semiconductor. The oxide semiconductor may be a compound composed of indium, gallium, zinc, and oxygen, a compound composed of indium, tin, zinc, and oxygen, a compound composed of indium, aluminum, zinc, and oxygen, or a compound composed of indium, zinc, and oxygen. An oxide semiconductor composed of indium, gallium, zinc, and oxygen generates a low off-leakage current and therefore enables pause drive during which the applied voltage is maintained until the next data is written. Thus, from the perspective of low power consumption, the oxide semiconductor is preferably a compound composed of indium, gallium, zinc, and oxygen.

The interlayer insulating film 14a may be an organic film or an inorganic film. The interlayer insulating film 14b may be an organic film or an inorganic film.

The materials of the pixel electrode 15, the lower electrode 17, and the upper electrode 18 may be a transparent material, such as indium tin oxide (ITO) or indium zinc oxide (IZO).

In the present embodiment, the lower substrate 2 is a thin-film transistor array substrate and includes an electrode and/or wire containing copper or aluminum. In this case, the upper substrate 3 may be a color filter substrate that includes a color filter layer on a transparent substrate. The color combination of the color filter layer is not particularly limited and may be a combination of red, green, and blue or a combination of red, green, blue, and yellow. Depending on the display mode of the liquid crystal display device 1, a common wiring, a common electrode electrically connected to the common wiring, and/or a structure, such as a rib, may be disposed on the color filter substrate. The material of the common electrode may be a transparent material, such as ITO or IZO. The color filter layer may be only disposed on the thin-film transistor array substrate.

The lower substrate 2 and the upper substrate 3 may be combined in any other way, provided that at least one of the lower substrate 2 and the upper substrate 3 includes an electrode and/or wire containing copper or aluminum.

The alignment film 4a and the alignment film 1b control the alignment of liquid crystal molecules in the liquid crystal layer 5. When the voltage applied to the liquid crystal layer 5 is lower than the threshold voltage (including no voltage application), the alignment of liquid crystal molecules in the liquid crystal layer 5 is mainly controlled by the alignment film 4a and the alignment film 4b. In this state, the angle between the surface of the alignment film 4a and the alignment film 4b and the long axis of liquid crystal molecules is referred to as the pretilt angle. In the present specification, the pretilt angle refers to the angle of the long axis of liquid crystal molecules to a direction parallel to the surface of the alignment film. The pretilt angle of liquid crystal molecules caused by the alignment film 4a and the alignment film 4b is not particularly limited.

The alignment film 4a and the alignment film 1b contain a polymer with a chemical structure on a side chain of the polymer, the chemical structure having a benzotriazole group represented by the following chemical formula (1).

[Chem. 5]

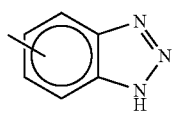

(1)

The benzotriazole group of the chemical structure on the side chain of the polymer contained in the alignment film 4a (The alignment film 4b) forms a complex with copper ions (aluminum ions) and can thereby suppress a redox reaction between copper ions (aluminum ions) and a carboxylic acid. This can suppress the generation of radicals in the alignment film, the generation of ions derived from radicals in the liquid crystal layer, and the decrease in voltage holding ratio. The benzotriazole group is chemically bonded to the side chain of the polymer contained in the alignment film. The benzotriazole group can absorb ultraviolet light. Thus, the benzotriazole group in the polymer contained in the alignment film (in particular, a layer closer to the transparent substrate 7 in the case of the alignment film with a 2-layer structure) can improve light fastness.

The chemical structure with the benzotriazole group preferably has a structure represented by the following chemical formula (2).

[Chem. 6]

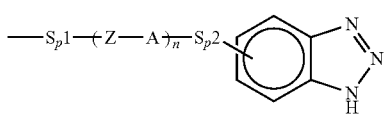

(2)

In the chemical formula (2), A denotes a 1,2-phenylene group, a 1,3-phenylene group, a 1,4-phenylene group, a naphthalene-1,4-diyl group, a naphthalene-1,5-diyl group, a naphthalene-2,6-diyl group, a 1,4-cyclohexylene group, a 1,4-cyclohexenylene group, a 1,4-bicyclo[2,2,2]octylene group, a piperidine-1,4-diyl group, a decahydronaphthalene-2,6-diyl group, a 1,2,3,4-tetrahydronaphthalene-2,6-diyl group, an indan-1,3-diyl group, an indan-1,5-diyl group, an indan-2,5-diyl group, a phenanthrene-1,6-diyl group, a phenanthrene-1,8-diyl group, a phenanthrene-2,7-diyl group, or a phenanthrene-3,6-diyl group. Sp1, Sp2, and Z are the same or different and denote an —O— group, a —S— group, a —NH— group, a —CO— group, a —COO— group, an —OCO— group, an —O—COO— group, an —OCH$_2$— group, a —CH$_2$O— group, a —SCH$_2$— group, a —CH$_2$S— group, a —N(CH$_3$)— group, a —N(C$_2$H$_5$)— group, a —N(C$_3$H$_7$)— group, a —N(C$_4$H$_2$)— group, a —CF$_2$O— group, an —OCF$_2$— group, a —CF$_2$S— group, a —SCF$_2$— group, a —N(CF$_3$)— group, a —CH$_2$CH$_2$— group, a —CF$_2$CH$_2$— group, a —CH$_2$CF$_2$— group, a —CF$_2$CF$_2$— group, a —CH═CH— group, a —CF═CF— group, a —C≡C— group, a —CH═CH—COO— group, an —OCO—CH═CH— group, or a direct bond. n denotes an integer of 0 or more.

n in the chemical formula (2) preferably denotes an integer in the range of 1 to 5. When n is an integer of 1 or more, the benzotriazole group is sufficiently separated from the main chain of the polymer, has sufficiently high mobility, and can effectively form a complex with copper ions (aluminum ions). When n is an integer of 5 or less, this results in a sufficiently small change (Δtilt) in the tilt angle of liquid crystal molecules due to the passage of electric current (voltage application).

The polymer in the alignment film 4a (the alignment film 4b) preferably has a photoreactive functional group. In this case, the alignment film 4a (the alignment film 4b) functions as a photo-alignment film. The photoreactive functional group can regulate the alignment direction of liquid crystal molecules by photoirradiation, that is, can exert an alignment regulating force.

The photoreactive functional group preferably includes at least one functional group selected from the group consisting of a cinnamate group, a chalcone group, a coumarin group, an azobenzene group, and a tolane group.

The alignment film 4a (the alignment film 4b) may align the liquid crystal molecules of the liquid crystal layer 5 parallel to the surface of the alignment film 1a (the alignment film 4b) (hereinafter referred to as a horizontal alignment film). In this case, the alignment film 4a (the alignment film 4b) can have both the function of suppressing a redox reaction as described above and the function of a horizontal alignment film. The horizontal alignment film may only have to align at least adjacent liquid crystal molecules parallel to the surface of the horizontal alignment film. In the present specification, the pretilt angle of liquid crystal molecules in the direction parallel to the surface of the alignment film ranges from 0 to 5 degrees. When the display mode of the liquid crystal display device 1 is a horizontal alignment mode, such as an in-plane switching (IPS) mode or a fringe field switching (FFS) mode, a horizontal alignment film is preferably employed. The horizontal alignment film may contain a polymer with a photoreactive functional group as described above (hereinafter also referred to as a horizontal photo-alignment film).

The alignment film 1a (the alignment film 1b) may align the liquid crystal molecules of the liquid crystal layer 5 perpendicularly to the surface of the alignment film 4a (the alignment film 4b) (hereinafter also referred to as a vertical alignment film). In this case, the alignment film 4a (the alignment film 4b) has the function of suppressing a redox reaction as described above and the function of the vertical alignment film. The vertical alignment film may only have to align at least adjacent liquid crystal molecules perpendicularly to the surface of the vertical alignment film. In the present specification, the pretilt angle of liquid crystal molecules in the direction perpendicular to the surface of the alignment film ranges from 82 to 90 degrees. When the display mode of the liquid crystal display device 1 is a vertical alignment mode, such as a multi-domain vertical alignment (MVA) mode or an ultraviolet induced multi-domain vertical alignment (UV2A) mode, a vertical alignment film is preferably employed. The vertical alignment may contain a polymer with a photoreactive functional group as described above (hereinafter also referred to as a vertical photo-alignment film).

The polymer in the alignment film 4a (the alignment film 4b) preferably contains at least one selected from the group consisting of poly(amic acid), polymide, polysiloxane, polyvinyl, polyacrylic, and polymethacrylic.

When the polymer in the alignment film 4a (the alignment film 4b) contains a poly(amic acid), the poly(amic acid) may be a compound represented by the following chemical formula (3).

[Chem. 7]

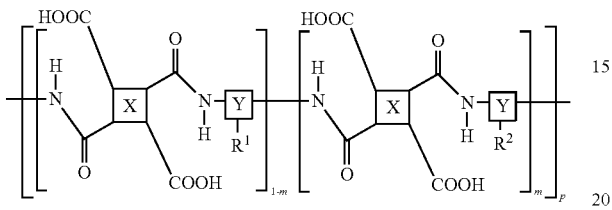
(3)

In the chemical formula (3), X is represented by one of the following chemical formulae (4-1) to (4-16).

[Chem. 8]

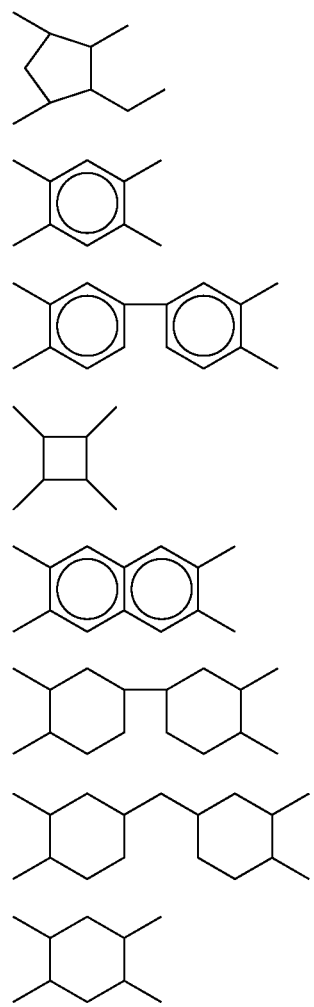

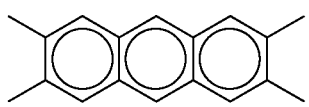
(4-9)

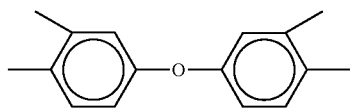
(4-10)

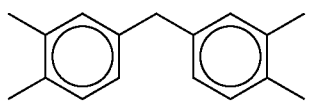
(4-11)

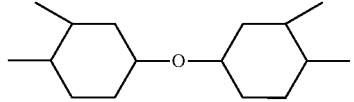
(4-12)

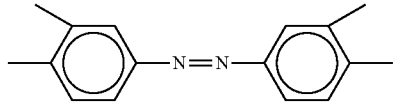
(4-13)

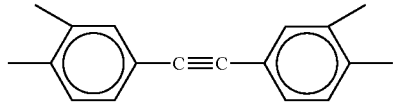
(4-14)

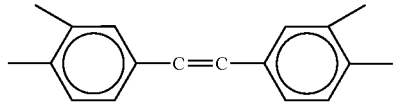
(4-15)

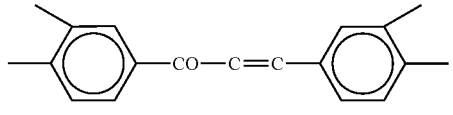
(4-16)

When X in the chemical formula (3) is represented by one of the chemical formulae (4-1) to (4-12), the alignment film 1a (the alignment film 1b) functions as a horizontal alignment film, a vertical alignment film, a horizontal photo-alignment film, or a vertical photo-alignment film. When X in the chemical formula (3) is represented by one of the chemical formulae (4-13) to (4-16), the alignment film 4a (the alignment film 4b) functions as a horizontal photo-alignment film or a vertical photo-alignment film.

In the chemical formula (3), Y is represented by one of the following chemical formulae (5-1) to (5-24).

[Chem. 9]

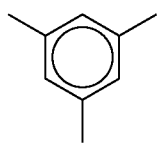
(5-1)

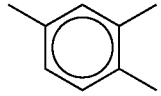
(5-2)

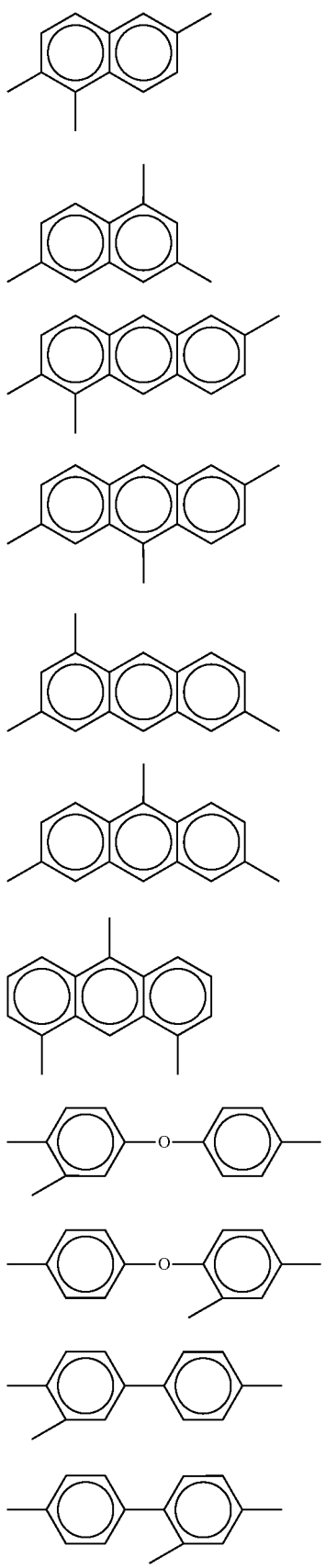
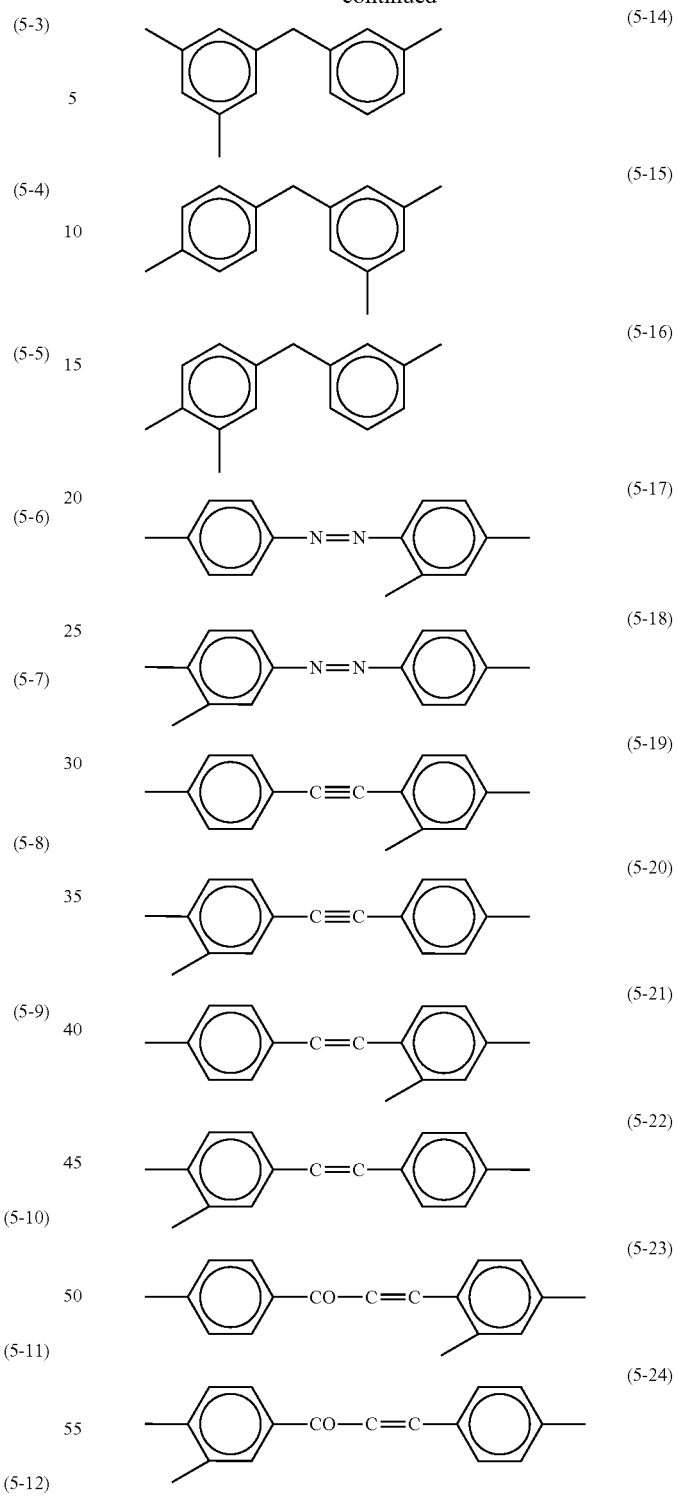

When Y in the chemical formula (3) is represented by one of the chemical formulae (5-1) to (5-24), the alignment film 4a (the alignment film 4b) functions as a horizontal alignment film, a vertical alignment film, a horizontal photo-alignment film, or a vertical photo-alignment film.

In the chemical formula (3), $R^1$ denotes a horizontal alignment functional group, a vertical alignment functional group, a photoreactive functional group, or a copolymer thereof.

The horizontal alignment functional group may be represented by one of the following chemical formulae (C-1) to (C-8). The alignment film 4a (the alignment film 4b) having such a horizontal alignment functional group functions as a horizontal alignment film.

[Chem. 10]

 (C-1)

 (C-2)

 (C-3)

 (C-4)

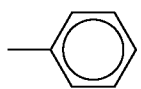 (C-5)

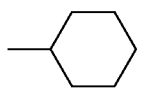 (C-6)

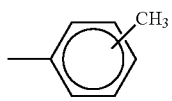 (C-7)

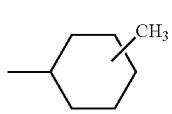 (C-8)

The vertical alignment functional group may be represented by one of the following chemical formulae (D-1) to (D-7). The alignment film 4a (the alignment film 4b) having such a vertical alignment functional group functions as a vertical alignment film.

[Chem. 11]

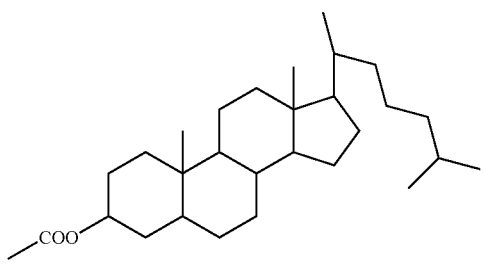 (D-1)

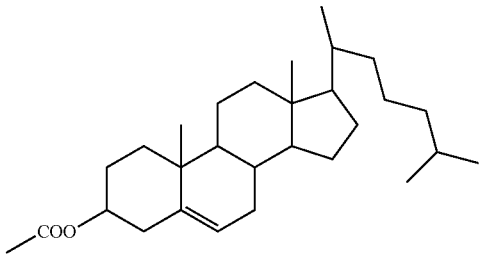 (D-2)

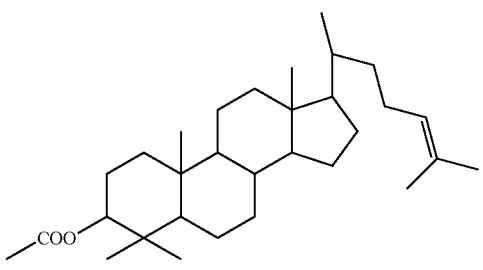 (D-3)

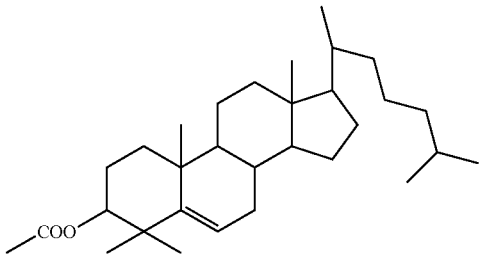 (D-4)

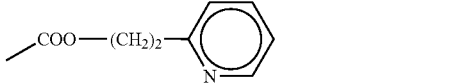 (D-5)

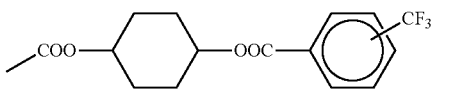 (D-6)

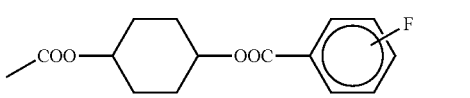 (D-7)

The photoreactive functional group may be represented by one of the following chemical formulae (E-1) to (E-25). The alignment film 4a (the alignment film 4b) having such a photoreactive functional group functions as a photo-alignment film.

[Chem. 12]

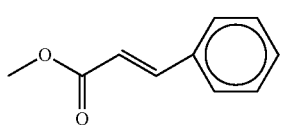 (E-1)

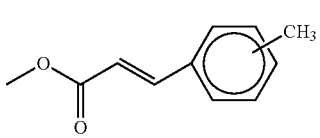 (E-2)

(E-3)
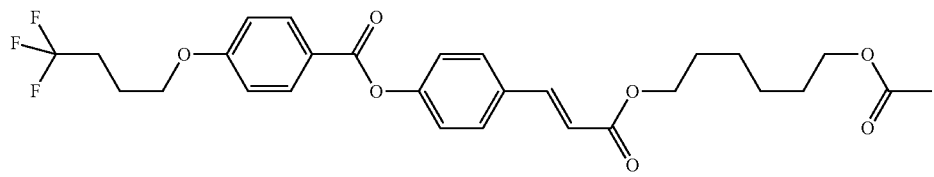
(E-4) (E-5)
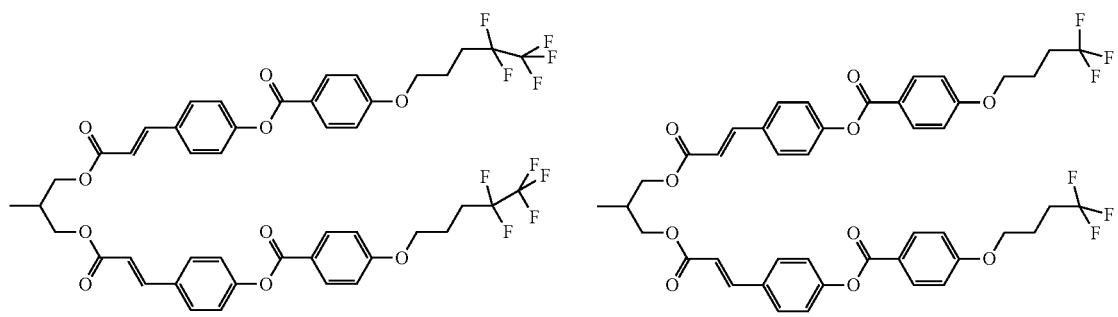
(E-6)
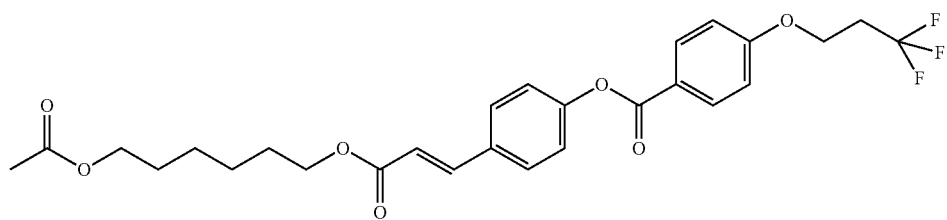
(E-7)
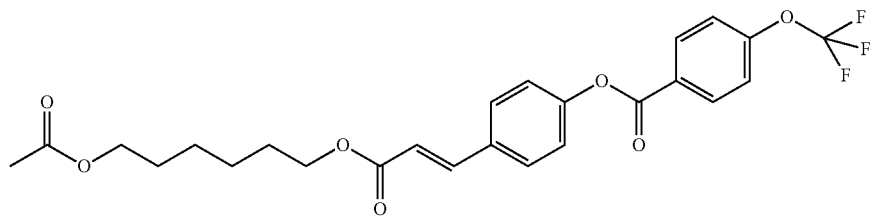
[Chem. 13]
(E-8)
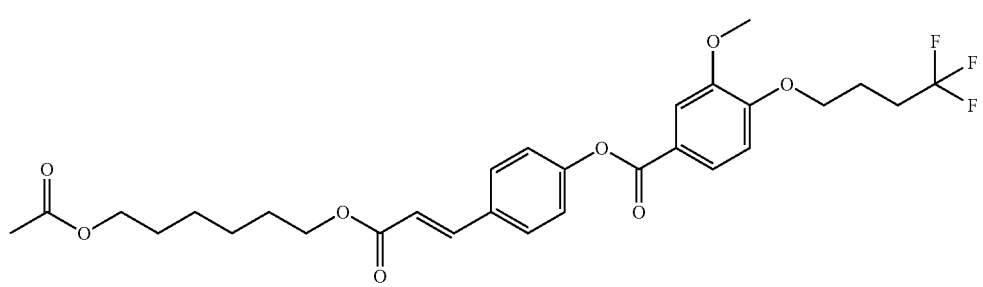
(E-9)
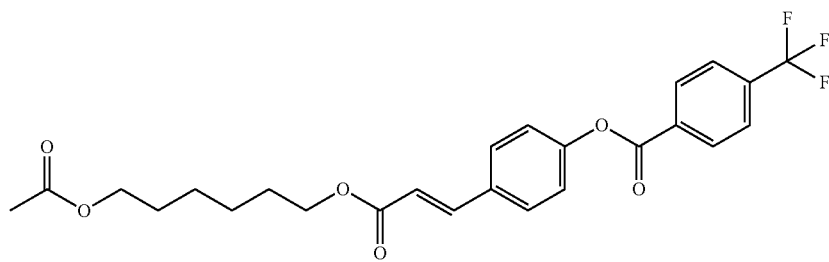

(E-10)
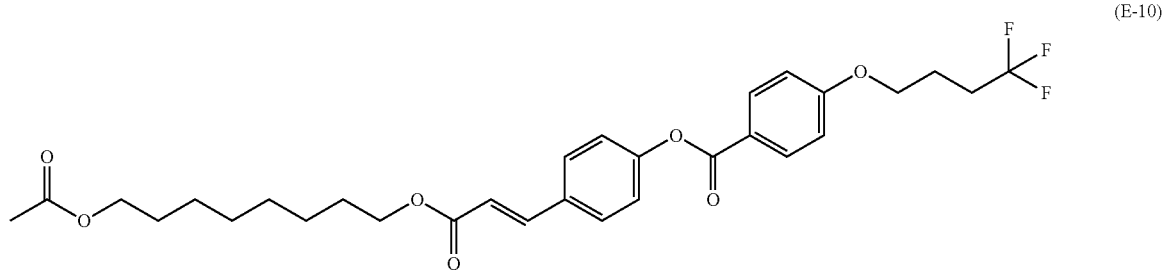
(E-11)
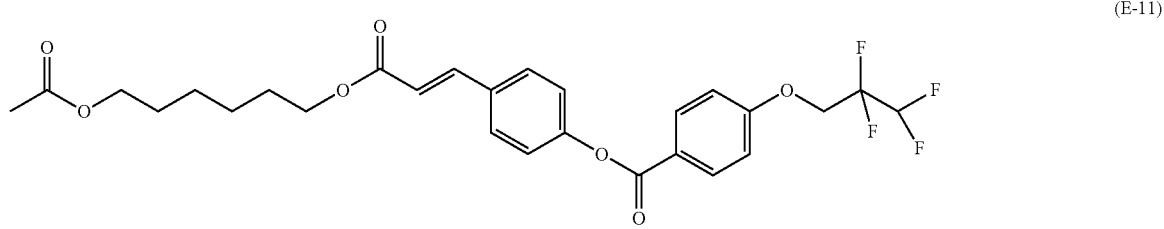
(E-12)
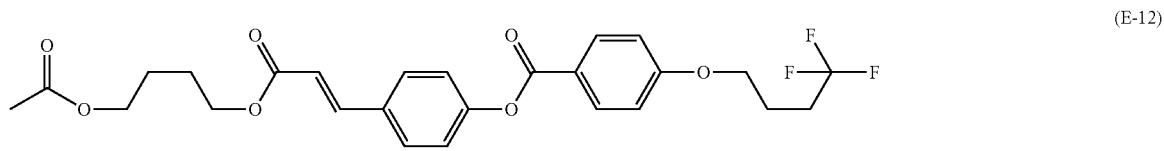
(E-13)
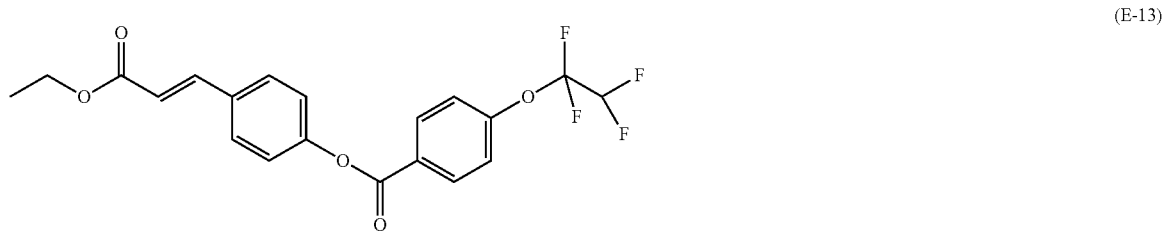
[Chem. 14]
(E-14)
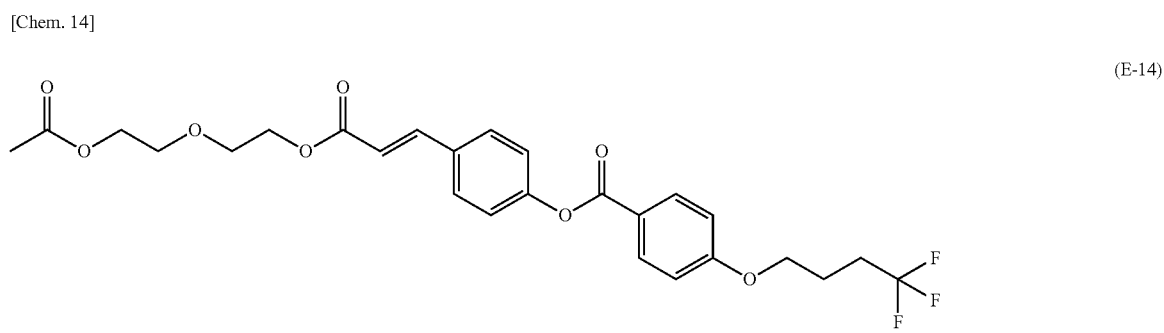
(E-15)　(E-16)
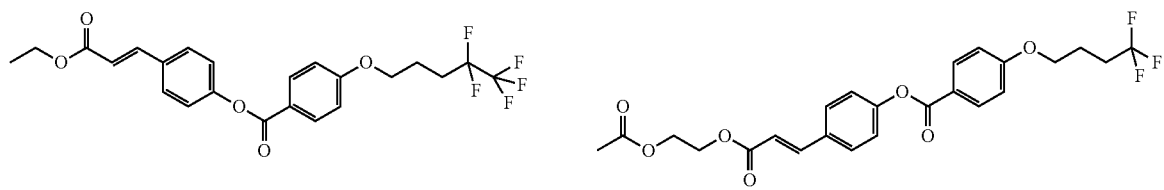
(E-17)
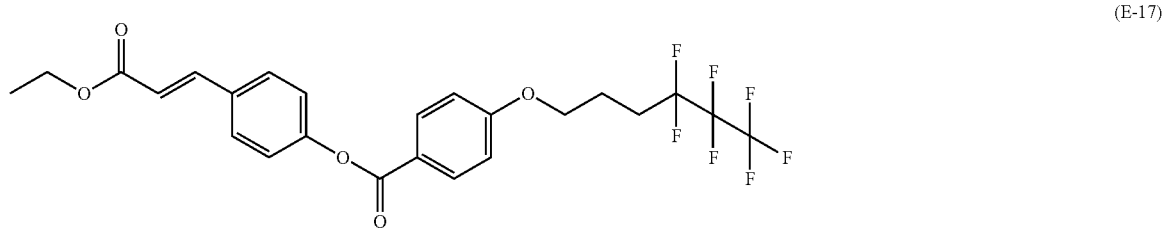

(E-18)
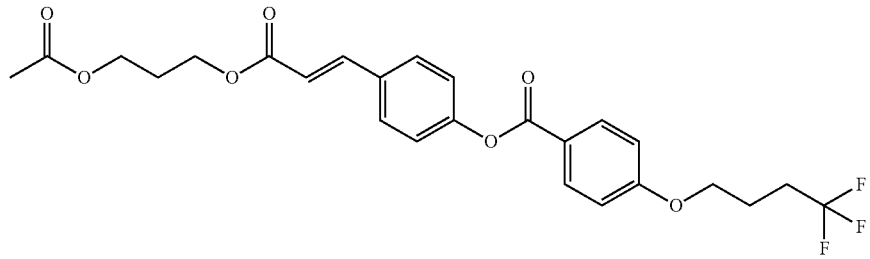
(E-19)
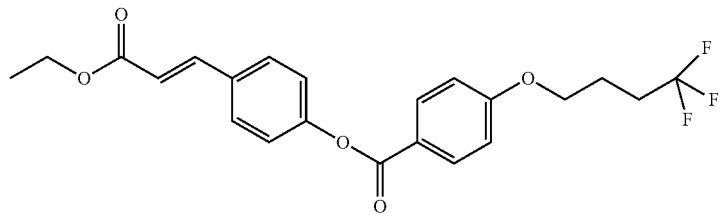
[Chem. 15]
(E-20)
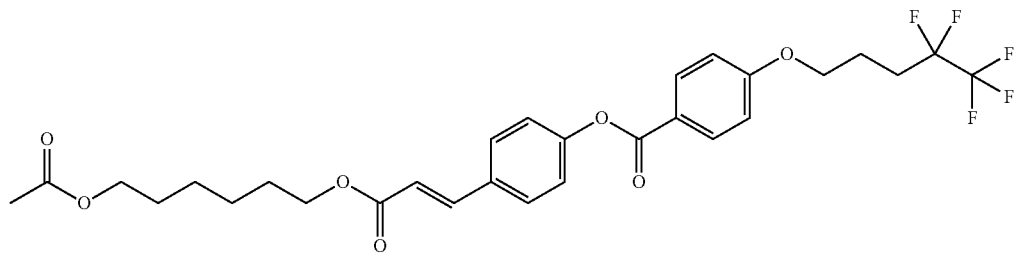
(E-21)
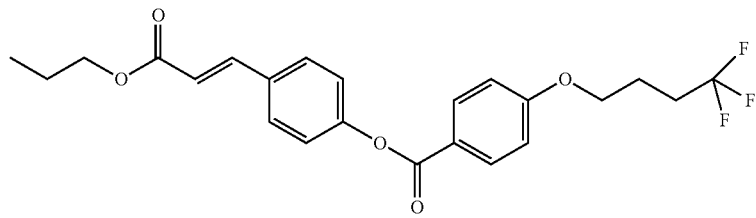
(E-22)
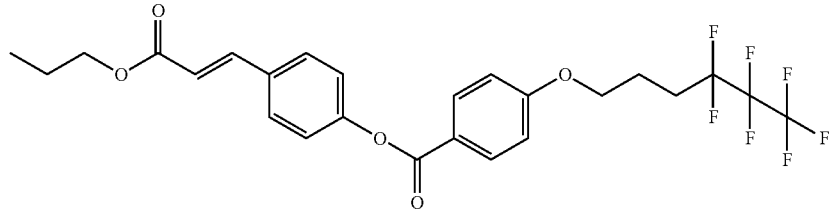
(E-23)
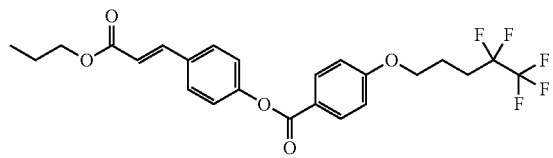
(E-24)
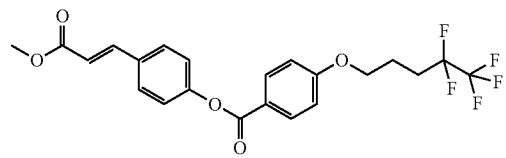

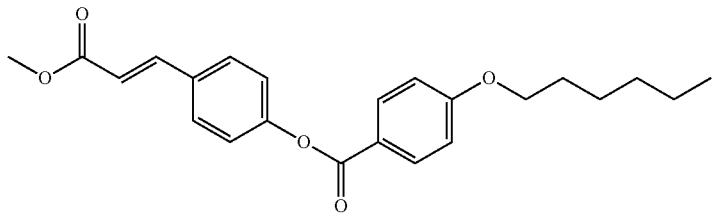

(E-25)

When R¹ in the chemical formula (3) is represented by the chemical formula (E-1) or (E-2), the alignment film 4a (the alignment film 4b) functions as horizontal photo-alignment film. When R¹ in the chemical formula (3) is represented by one of the chemical formulae (E-3) to (E-25), the alignment film 4a (the alignment film 4b) functions as a vertical photo-alignment film.

In the chemical formula (3), $R^2$ represents a chemical structure (functional group) with a terminal benzotriazole group. $R^2$ is preferably a structure represented by the chemical formula (2).

In the chemical formula (3), m is more than 0 and less than 1. m preferably ranges from 0.001 to 0.5, more preferably 0.01 to 0.2. When m is 0.001 or more, a complex of the benzotriazole group and copper ions (aluminum ions) is effectively formed, thereby sufficiently suppressing a redox reaction. When m is 0.5 or less, the alignment of liquid crystal molecules can be easily controlled. The value of m can be appropriately determined according to the alignment state of liquid crystal molecules. p denotes the degree of polymerization and is an integer of 1 or more.

In the chemical formula (3) of poly(amic acid), preferably, X is represented by the chemical formula (4-1), Y is represented by the chemical formula (5-1) or (5-2), and $R^2$ is represented by the chemical formula (2).

When the polymer in the alignment film 4a (the alignment film 4b) contains a polyimide, the polyimide may be a compound represented by the following chemical formula (F).

[Chem. 16]

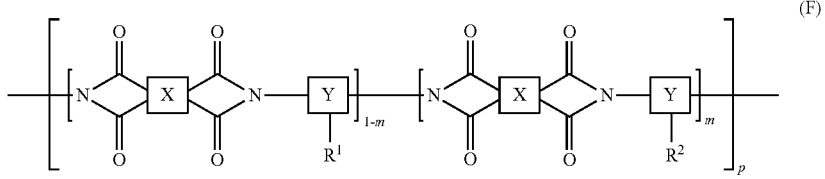

(F)

$X, Y, R^1, R^2$, m, and p in the chemical formula (F) are the same as $X, Y, R^1, R^2$, m, and p in the chemical formula (3).

A poly(amic acid) represented by the chemical formula (3) is heated to form a polyimide represented by the chemical formula (F). In this case, the resulting polymer in the alignment film 4a (the alignment film 4b) contains a poly (amic acid) represented by the chemical formula (3) and a polyimide represented by the chemical formula (F) depending on the imidization rate. Thus, when the polymer in the alignment film is (the alignment film 4b) contains a polyimide represented by the chemical formula (F), the polymer is formed from a poly(amic acid) represented by the chemical formula (3).

When the polymer in the alignment film 4a (the alignment film 4b) contains a polysiloxane, the polysiloxane may be a compound represented by the following chemical formula (6).

[Chem. 17]

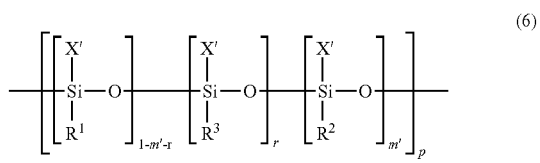

(6)

In the chemical formula (6), X' denotes —H, —OH, a methoxy group, or an ethoxy group.

In the chemical formula (6), $R^3$ denotes a functional group with a terminal carboxy group, $R^3$ is preferably a structure represented by the chemical formula (G).

[Chem. 18]

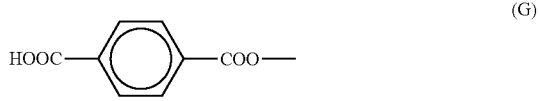

(G)

In the chemical formula (6), m' and r are more than 0 and less than 1 and satisfy m'+r<1. m' preferably ranges from 0.001 to 0.5, more preferably 0.01 to 0.2. When m' is 0.001 or more, the benzotriazole group can effectively form a complex with copper ions (aluminum ions), thereby sufficiently suppressing a redox reaction. When m' is 0.5 or less, the alignment of liquid crystal molecules can be easily controlled.

$R^1, R^2$, and p in the chemical formula (6) are the same as $R^1, R^2$, and p in the chemical formula (3).

In a polysiloxane represented by the chemical formula (6), $R^2$ is preferably represented by the chemical formula (2).

When the polymer in the alignment film 4a (the alignment film 4b) contains a polyvinyl, the polyvinyl may be a compound represented by the following chemical formula (H).

[Chem. 19]

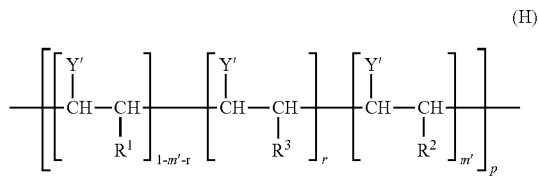

(H)

In the chemical formula (H), Y' denotes —H, —$CH_3$, or —$C_2H_5$.

$R^1$, $R^2$, $R^3$, m', r, and p in the chemical formula (H) are the same as $R^1$, $R^2$, $R^3$, m', r, and p in the chemical formula (6).

When the polymer in the alignment film 4a (the alignment film 4b) contains a polyacrylic, the polyacrylic may be a compound represented by the chemical formula (H) in which Y' denotes —H.

When the polymer in the alignment film 4a (the alignment film 4b) contains a polymethacrylic, the polymethacrylic may be a compound represented by the chemical formula (H) in which Y' denotes —$CH_3$.

The polymer in the alignment film 4a (the alignment film 4b) may have a carboxy group. Even when the polymer in the alignment film 4a (the alignment film 4b) has a carboxy group, or even when the polymer contains a carboxylic acid, a redox reaction with copper ions (aluminum ions) can be suppressed.

The alignment film 4a (the alignment film 4b) may be monolayer or multilayer. For example, when the alignment film 4a (the alignment film 4b) has a 2-layer structure including a photo-alignment layer (facing the liquid crystal layer 5) and an underlayer (opposite the liquid crystal layer 5), a polymer in the photo-alignment layer and/or a polymer in the underlayer may have a side chain having a chemical structure with a benzotriazole group.

The liquid crystal molecules in the liquid crystal layer 5 may have negative dielectric constant anisotropy (a negative liquid crystal) or positive dielectric constant anisotropy (a positive liquid crystal). Although negative liquid crystals absorb more water and copper ions (aluminum ions) than positive liquid crystals, as described above, even a negative liquid crystal in the alignment film 4a (the alignment film 4b) can suppress a redox reaction.

The display mode of the liquid crystal display device 1 is not particularly limited and may be a horizontal alignment mode, such as an IPS mode, an FFS mode, or a twisted nematic (TN) mode, or a vertical alignment mode, such as an MVA mode or a UV2A mode. For example, a thin-film transistor array substrate with the structure illustrated in FIG. 2 may be used for the IPS mode, the TN mode, the MVA mode, and the UV2A mode. For example, a thin-film transistor array substrate with the structure illustrated in FIG. 3 is used for the FFS mode.

Although the present disclosure will be further described in the following examples and comparative examples, the present disclosure is not limited to these examples.

Example 1

A liquid crystal display device was produced by the following method.

(a) Preparation of Substrate

A thin-film transistor array substrate with the structure illustrated in FIG. 2 was prepared as the lower substrate 2. The gate electrode 9, the source electrode 10, and the drain electrode 11 were electrodes containing copper. The pixel electrode 15 was an ITO electrode. The upper substrate 3 was a substrate with no electrode.

(b) Preparation of Aligning Agent

An aligning agent containing a poly(amic acid) as a solid component was produced by the following processes.

(Process 1)

5 ml of thionyl chloride ($SOCl_2$) was added dropwise to 20 ml of a benzene solution containing 0.82 g (approximately 5 mmol) of benzotriazole-5-carboxylic acid (molecular weight: 163) represented by the following chemical formula (J-2) to synthesize benzotriazole-5-carboxylic acid chloride (molecular weight: 181.5) represented by the following chemical formula (J-3). The yield of benzotriazole-5-carboxylic acid chloride was 93% (4.65 mmol). 5 ml of a benzene solution containing 0.46 g (approximately 2.5 mmol) of benzotriazole-5-carboxylic acid chloride represented by the following chemical formula (J-3) was added dropwise at 20° C. in a nitrogen atmosphere to 20 ml of a benzene solution containing 0.42 g (approximately 2.5 mmol) of ethyl 4-hydroxybenzoate (molecular weight: 165) represented by the following chemical formula (J-1) and 0.5 g (5 mmol) of triethylamine (molecular weight: 100). A reaction was then performed at 20° C. for 2 hours. After the completion of the reaction, impurities were extracted with water, and purification with column chromatography yielded 0.7 g (approximately 2.3 mmol) of a compound represented by the following chemical formula (J-4) (molecular weight: 311). The yield of the compound was 90%. The solvent used in the column chromatography was a toluene/ethyl acetate mixed solvent (weight ratio 4:1).

[Chem. 20]

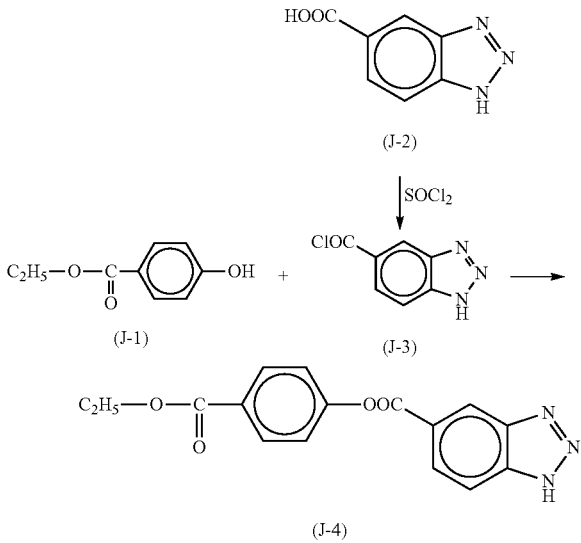

(Process 2)

2 ml of aqueous sodium hydroxide and 2 ml of hydrochloric acid were successively added dropwise to 20 ml of a tetrahydrofuran (THF)/methanol mixed solution containing 0.62 g (approximately 2 mmol) of the compound represented by the following chemical formula (J-4) produced in the process 1. Subsequently, 0.537 g (approximately 1.9 mmol) of a carboxylic acid compound represented by the following chemical formula (J-5) (molecular weight: 283) was synthesized while stirring for 1 hour.

[Chem. 21]

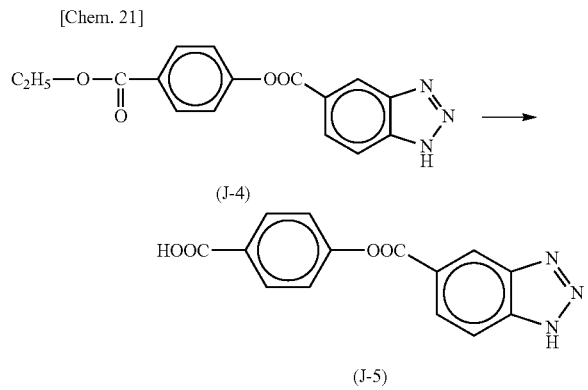

(Process 3)

The processes 1 and 2 were repeatedly performed to synthesize a carboxylic acid compound represented by the following chemical formula (J-6). An the following chemical formula (J-6), n denotes an integer of 0 or more and can be appropriately determined according to the number of repetitions of the processes 1 and 2.

[Chem. 22]

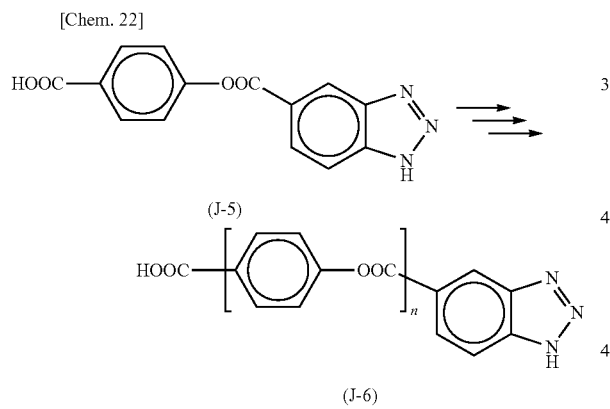

(Process 4)

7 ml of a borane dimethyl sulfide ($BH_3S(CH_3)_2$)-toluene solution (concentration of borane dimethyl sulfide: 1.9 M) was added dropwise to 3 g of dinitrophenylacetic acid represented by the following chemical formula (J-7) dissolved in 20 ml of THF. After leaving to stand at 20° C. for 10 hours, 10 ml of 50% aqueous methanol was added dropwise to stop the reaction. Subsequently, the reaction product was extracted with 10 ml of chloroform, was washed with 5% aqueous sodium hydrogen carbonate and water, and was concentrated until no extract was observed in an organic layer. The resulting liquid was then dissolved in 20 ml of chloroform and was purified by alumina column chromatography. The resulting distillate was concentrated. A toluene/n-heptane mixed solution (weight ratio 6:4) was added to the concentrate to separate a component hot-extracted at 70° C. The upper layer component was decanted and cooled to produce 2,4-dinitrophenylethanol represented by the following chemical formula (J-8). The yield of 2,4-dinitrophenylethanol was 42.7% (1.2 g).

0.4 g of 2,4-dinitrophenylethanol represented by the following chemical formula (J-8) was dissolved in κ ml of a mixed solvent of Japan Alcohol Trading Co., Ltd. (product name: Solmix (registered trademark) AP-1). 0.06 g of Raney nickel was added to the solution, and the solution was poured into an autoclave. The autoclave was purged with hydrogen and was left to stand at 20° C. and at 0.4 MPa for 10 hours. The termination of the reaction was confirmed by high-performance liquid chromatography (HPLC). The reaction product (liquid) was filtered through Celite (registered trademark) manufactured by Imerys Minerals. The filtrate was concentrated until no distillate was observed. The resulting crude liquid was distilled under reduced pressure to produce 2,4-diaminophenylethanol represented by the following chemical formula (J-9). The yield of 2,4-diaminophenylethanol was 80% (0.69 g).

1.8 g of t-butoxycarbonyl anhydride (($t-BuOCO)_2O$) dissolved in 5 ml of THF was then added dropwise to 2,4-diaminophenylethanol represented by the following chemical formula (J-9) dissolved in 5 ml of acetone. The solution was then heated to the reflux temperature (80° C.) and was left to stand for 10 hours. After the completion of the reaction, the reaction product (liquid) was concentrated and dried to produce a Boc compound represented by the following chemical formula (J-10) (molecular weight: 352). The yield of the Boc compound was 91% (0.13 g).

[Chem. 23]

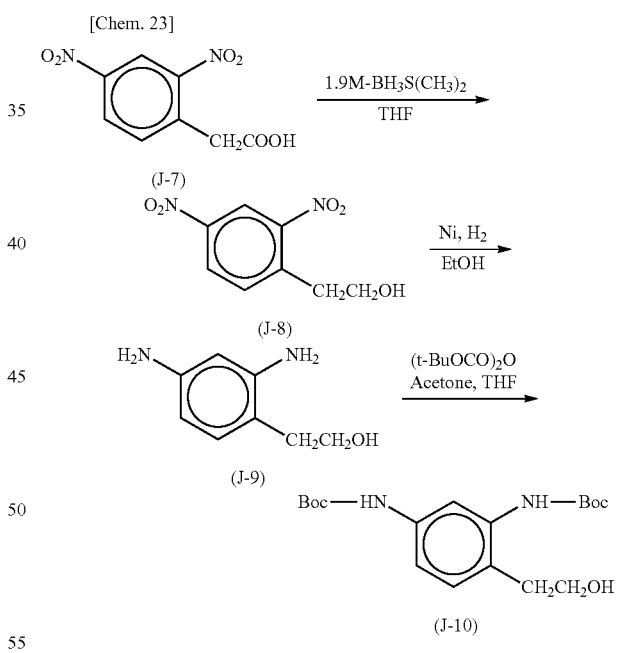

(Process 5) 0.15 g of the carboxylic acid compound represented by the following chemical formula (J-6) (n=3) produced in the process 3 and 0.10 g of the Boc compound represented by the following chemical formula (J-10) produced in the process 4 were allowed to react in the same manner as in the process 1 to synthesize 0.22 g of a compound represented by the following chemical formula (J-11) (n=3). 0.125 g of tin (II) trifluoromethanesulfonate ($Sn(OTf)_2$) was added stepwise at 0° C. to 0.20 g of the compound represented by the following chemical formula (J-11) (n=3) dissolved in 10 ml of methylene chloride ($CH_2Cl_2$). After the completion of the reaction at 20° C., 10 ml of 5% aqueous sodium hydrogen carbonate was added for neutralization. The reaction product was then washed with water to neutral pH. The organic layer was dried with anhydrous magnesium sulfate and was filtered through Celite manufactured by Imerys Minerals. The filtrate was concentrated to produce a diamine monomer represented by the following chemical formula (J-12). The yield of the diamine monomer (n=3) was 88% (0.135 g).

[Chem. 24]

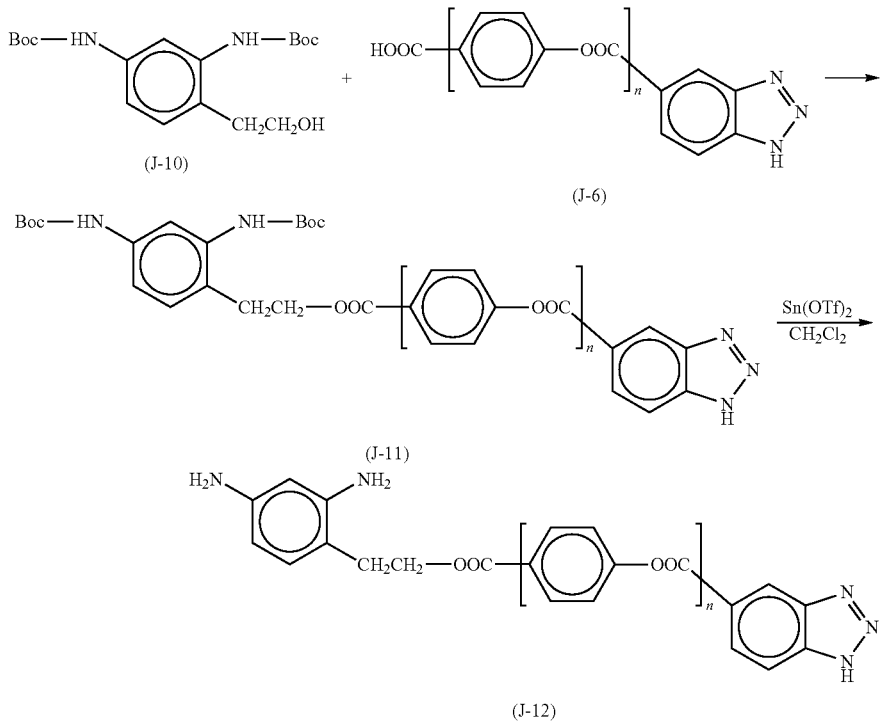

(Process 6)

An acid anhydride represented by the following chemical formula (K) was added to a γ-butyrolactone solution containing the diamine monomer represented by the following chemical formula (J-12) produced in the process 5 and a diamine with a photoreactive functional group represented by the following chemical formula (L). The solution was allowed to react at 60° C. for 12 hours to produce a poly(amic acid) represented by the following chemical formula (3).

[Chem. 25]

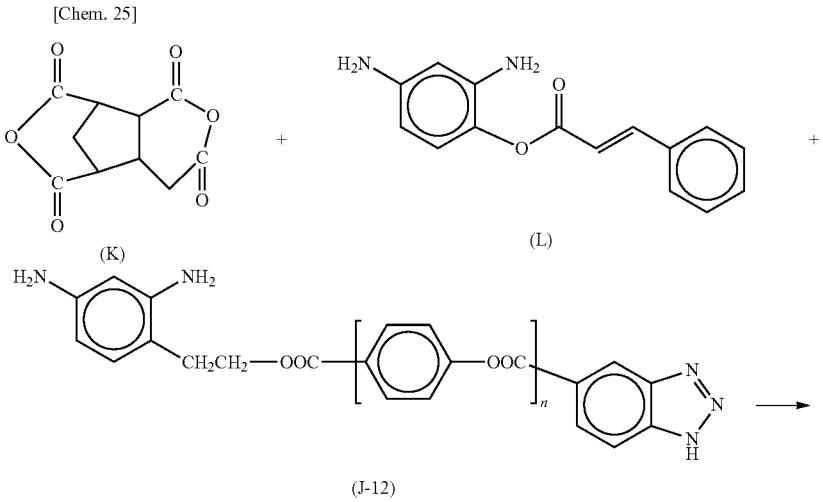

-continued

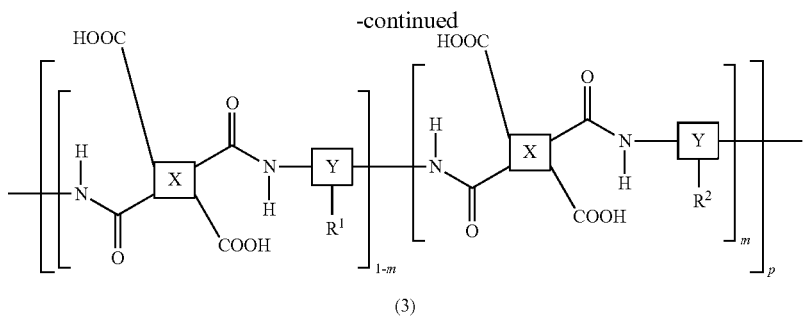

(3)

In the chemical formula (3), X is represented by the following chemical formula (4-1).

[Chem. 26]

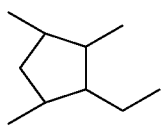

(4-1)

In the chemical formula (3), the combined structure of Y and $R^1$ is represented by the following chemical formula (M). The structure represented by the following chemical formula (M) corresponds to the combined structure of the chemical formula (5-2) and the chemical formula (E-1).

[Chem. 27]

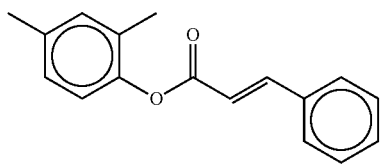

(M)

In the chemical formula (3), the combined structure of Y and $R^2$ is represented by the following chemical formula (N).

[Chem. 28]

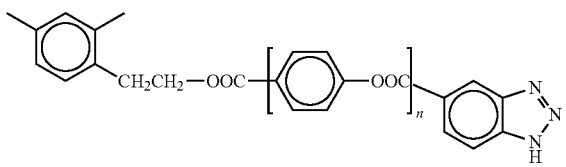

(N)

In the present example, n in the chemical formula (N) was 3. More specifically, the processes 1 and 2 were (alternately) performed three times in the process 3 to produce a carboxylic acid compound represented by the chemical formula (J-6) with n=3. The processes 4, 5, and 6 were then successively performed.

In the present example, m in the chemical formula (3) was 0.05. More specifically, the amount of each material in the process 6 was as follows:

a diamine monomer represented by the chemical formula (J-12): 0.005 mol, a diamine with a photoreactive functional group represented by the chemical formula (L): 0.095 mol, and an acid anhydride represented by the chemical formula (K): 0.10 mol.

An aligning agent containing a poly(amic acid) as a solid component was produced in this way. The solid content was 6% by weight, and the solvent was a mixed solvent of N-methylpyrrolidone (NMP), butyl cellosolve, and γ-butyrolactone.

(c) Formation of Alignment Film

The aligning agent produced in (b) was applied to the lower substrate 2 and the upper substrate 3. The substrates to which the aligning agent was applied were heated at 90° C. for 5 minutes and were calcined to evaporate the solvent of the aligning agent. The calcined substrates were then baked at 230° C. for 40 minutes. The baking caused the imidization of the poly(amic acid) and thereby formed a polyimide. The polyimide thus formed had a weight-average molecular weight of 30000 and a molecular weight distribution of 2.5. The imidization rate was 50% or more. Subsequently, the surfaces of the substrates were subjected to photo-alignment treatment by irradiating the surfaces with linearly polarized ultraviolet light with a dominant wavelength of 330 nm at an intensity of 5 J/cm². Horizontal photo-alignment films (the alignment film 4a and the alignment film 4b) were formed on the lower substrate 2 and the upper substrate 3 in this way. The horizontal photo-alignment films had a thickness of 100 nm (after baking).

The poly(amic acid) was able to be imidized by a method different from the method of the present example. More specifically, a solution of the poly(amic acid) in γ-butyrolactone, 0.5 mol of pyridine, and 0.3 mol of acetic anhydride were allowed to react at 150° C. for 3 hours. The polyimide thus formed had a weight-average molecular weight of 30000 and a molecular weight distribution of 2.5. The imidization rate was 80% or more.

(d) Completion of Liquid Crystal Display Device

A negative liquid crystal (anisotropy of dielectric constant Δε: −3.0) was dropped on the lower substrate 2 at a predetermined position as a material for the liquid crystal layer 5. An ultraviolet-curable sealing material manufactured by Sekisui Chemical Co. Ltd. (product name: Photolec S-WB) was applied as the sealing material 6 to the upper substrate 3 with a dispenser. The substrates were bonded together under vacuum such that the polarization directions of linearly polarized ultraviolet light emitted were parallel to each other. The sealing material 6 was cured by ultraviolet light irradiation while the display area was shaded. A realignment treatment for converting the liquid crystal layer 5 into an isotropic phase was then performed at 130° C. for 40 minutes. After cooling to 20° C., a backlight was placed on the lower substrate 2 opposite the liquid crystal layer 5 to produce a liquid crystal display device of an IPS mode with a horizontal photo-alignment film.

Example 2

A liquid crystal display device was produced in the same manner as in Example 1 except that m in the chemical formula (3) was changed.

m in the chemical formula (3) was 0.10. More specifically, the amount of each material in the process 6 was as follows:
a diamine monomer represented by the chemical formula (J-12): 0.010 mol,
a diamine with a photoreactive functional group represented by the chemical formula (L): 0.090 mol, and
an acid anhydride represented by the chemical formula (K): 0.10 mol.

Example 3

A liquid crystal display device was produced in the same manner as in Example 1 except that m in the chemical formula (3) was changed.

m in the chemical formula (3) was 0.15. More specifically, the amount of each material in the process 6 was as follows:
a diamine monomer represented by the chemical formula (J-12): 0.015 mol,
a diamine with a photoreactive functional group represented by the chemical formula (L): 0.085 mol, and
an acid anhydride represented by the chemical formula (K): 0.10 mol.

Example 4

A liquid crystal display device was produced in the same manner as in Example 1 except that m in the chemical formula (3) was changed.

m in the chemical formula (3) was 0.20. More specifically, the amount of each material in the process 6 was as follows:
a diamine monomer represented by the chemical formula (J-12): 0.020 mol,
a diamine with a photoreactive functional group represented by the chemical formula (L): 0.080 mol, and
an acid anhydride represented by the chemical formula (K): 0.10 mol, Comparative Example 1

A liquid crystal display device was produced in the same manner as in Example 1 except that m in the chemical formula (3) was changed.

m in the chemical formula (3) was 0. More specifically, the amount of each material in the process 6 was as follows:
a diamine monomer represented by the chemical formula (J-12): 0 mol (no addition),
a diamine with a photoreactive functional group represented by the chemical formula (L): 0.10 mol, and
an acid anhydride represented by the chemical formula (K): 0.10 mol.

Thus, in the liquid crystal display device according to Comparative Example 1, the polymer in the alignment film had no benzotriazole group.

Comparative Example 2

A liquid crystal display device was produced in the same manner as in Comparative Example 1 except that a light stabilizer described in Patent Literature 1 was added to the aligning agent.

5% by weight of TINUVIN 234 manufactured by Ciba Specialty Chemicals Co., Ltd. described in Example 21 of Patent Literature 1 was added as a light stabilizer to a solid component of the aligning agent (poly(amic acid)).

[Evaluation Test 1]

The liquid crystal display devices according to Examples 1 to 4 and Comparative Examples 1 and 2 were left to stand at 75° C. for 5000 hours with the backlight on (luminance: 5000 cd/m$^2$). The voltage holding ratio and contrast of the liquid crystal display devices were measured before and after the liquid crystal display devices were left standing. Table 1 shows the results. The voltage holding ratio was measured with a liquid crystal physical property evaluation system manufactured by Toyo Corporation (product name: 6254 type). The applied voltage was 1 V, and the measurement temperature was 70° C. The contrast was measured with a spectroradiometer (product name: SR-UL1) manufactured by Topcon Corporation. The measurement temperature was 25° C.

TABLE 1

|  | | | Before left standing | | After left standing | |
|---|---|---|---|---|---|---|
|  | m | n | Voltage holding ratio (%) | Contrast | Voltage holding ratio (%) | Contrast |
| Example 1 | 0.05 | 3 | 99.5 | 1500 | 95.0 | 1100 |
| Example 2 | 0.10 | 3 | 99.5 | 1500 | 98.0 | 1170 |
| Example 3 | 0.15 | 3 | 99.5 | 1500 | 99.5 | 1450 |
| Example 4 | 0.20 | 3 | 99.5 | 1500 | 99.5 | 1450 |
| Comparative example 1 | 0 | — | 99.5 | 1500 | 86.5 | 800 |
| Comparative example 2 | 0 | — | 99.5 | 1350 | 93.5 | 1000 |

Table 1 shows that Examples 1 to 4 maintained a high voltage holding ratio for extended periods. Examples 3 and 4 were particularly excellent with no decrease in voltage holding ratio after left standing. An increase in m resulted in a smaller decrease in voltage holding ratio and contrast after left standing. This is probably because an increase in m results in an increase in benzotriazole group content and consequently more effective formation of a complex between the benzotriazole group and copper ions, thus sufficiently suppressing a redox reaction.

By contrast, the voltage holding ratio and the contrast after left standing in Comparative Example 1 decreased greatly. This is probably because the polymer in the alignment film had no benzotriazole group, radicals were formed by a redox reaction between copper ions and the carboxylic acid (carboxy group) in the poly(amic acid), and consequently ions were formed from the radicals in the liquid crystal layer.

The decrease in voltage holding ratio and contrast after left standing was smaller in Comparative Example 2 than in Comparative Example 1. However, the contrast before left standing was smaller in Comparative Example 2 than in the other examples, and the voltage holding ratio and the contrast after left standing decreased in Comparative Example 2.

The following are possible reasons for the low contrast before left standing in Comparative Example 2.

(i) Due to its low molecular weight, the light stabilizer was nonuniformly dispersed and aggregated in the alignment film, thus reducing the function of the alignment film for controlling the alignment of liquid crystal molecules. In contrast, in the examples, the benzotriazole group on a side chain of the polymer contained in the alignment film tended to be uniformly distributed in the alignment film, and this state was unchanged for extended periods.

(ii) Due to its low molecular weight, the light stabilizer was nonuniformly distributed on the surface of the alignment film, thus reducing the function of the alignment film for controlling the alignment of liquid crystal molecules. In contrast, in the examples, the benzotriazole group on a side chain of the polymer contained in the alignment film tended to be distributed on the surface of the alignment film, and this state was unchanged for extended periods.

In addition to (i) and (ii), the following are possible reasons for the low voltage holding ratio and contrast after left standing in Comparative Example 2.

(iii) Due to its low molecular weight, the light stabilizer aggregated in the alignment film, thereby promoting charge transfer and decreasing the resistance of the alignment film. A decrease in the resistance of the alignment film as responsible for a decreased voltage holding ratio and an increased residual DC voltage.

(iv) Due to its low molecular weight, the light stabilizer was eluted into the liquid crystal layer and formed impurities ions. In contrast, in the examples, the benzotriazole group on a side chain of the polymer contained in the alignment film is not eluted into the liquid crystal layer and does not reduce reliability.

Example 5

A liquid crystal display device was produced in the same manner as in Example 1 except that the display mode of the liquid crystal display device, m in the chemical formula (3), and n in the chemical formula (N) were changed.

A thin-film transistor array substrate with the structure illustrated in FIG. 3 was prepared as the lower substrate 2. The gate electrode 9, the source electrode 10, and the drain electrode 11 were electrodes containing copper. The lower electrode 17 and the upper electrode 18 were ITO electrodes. The upper substrate 3 was a substrate with no electrode.

m in the chemical formula (3) was 0.10. More specifically, the amount of each material in the process 6 was as follows:
a diamine monomer represented by the chemical formula (J-12): 0.010 mol,
a diamine with a photoreactive functional group represented by the chemical formula (L): 0.090 mol, and
an acid anhydride represented by the chemical formula (K): 0.10 mol.

n in the chemical formula (N) was 0. More specifically, the processes 4, 5, and 6 were successively performed using a carboxylic acid compound represented by the chemical formula (J-6) with n=0, that is, benzotriazole-5-carboxylic acid represented by the chemical formula (J-2).

Thus, a liquid crystal display device of an FFS mode including a horizontal photo-alignment film was produced.

Example 6

A liquid crystal display device was produced in the same manner as in Example 5 except that n in the chemical formula (N) was changed.

n in the chemical formula (N) was 1. More specifically, the processes 1 and 2 were performed once in the process 3 to produce a carboxylic acid compound represented by the chemical formula (J-5) with n=1. The processes 4, 5, and 6 were then successively performed.

Example 7

A liquid crystal display device was produced in the same manner as in Example 5 except that n in the chemical formula (N) was changed.

n in the chemical formula (N) was 2. More specifically, the processes 1 and 2 were (alternately) performed two times in the process 3 to produce a carboxylic acid compound represented by the chemical formula (J-6) with n=2. The processes 4, 5, and 5 were then successively performed.

Example 8

A liquid crystal display device was produced in the same manner as in Example 5 except that n in the chemical formula (N) was changed.

n in the chemical formula (N) was 3. More specifically, the processes 1 and 2 were (alternately) performed three times in the process 3 to produce a carboxylic acid compound represented by the chemical formula (J-6) with n=3. The processes 4, 5, and 6 were then successively performed.

Example 9

A liquid crystal display device was produced in the same manner as in Example 5 except that n in the chemical formula (N) was changed.

n in the chemical formula (N) was 4. More specifically, the processes 1 and 2 were (alternately) performed four times in the process 3 to produce a carboxylic acid compound represented by the chemical formula (J-6) with n=4. The processes 4, 5, and 6 were then successively performed.

Example 10

A liquid crystal display device was produced in the same manner as in Example 5 except that n in the chemical formula (N) was changed.

n in the chemical formula (N) was 5. More specifically, the processes 1 and 2 were (alternately) performed five times in the process 3 to produce a carboxylic acid compound represented by the chemical formula (J-6) with n=5. The processes 4, 5, and 6 were then successively performed.

Comparative Example 3

A liquid crystal display device was produced in the same manner as in Example 5 except that m in the chemical formula (3) was changed.

m in the chemical formula (3) was 0. More specifically, the amount of each material in the process 6 was as follows:
a diamine monomer represented by the chemical formula (J-12): 0 mol (no addition),
a diamine with a photoreactive functional group represented by the chemical formula (L): 0.10 mol, and
an acid anhydride represented by the chemical formula (K): 0.10 mol.

Thus, in the liquid crystal display device according to Comparative Example 3, the polymer in the alignment film had no benzotriazole group.

[Evaluation Test 2]

In the same manner as in the evaluation test 1, the liquid crystal display devices according to Examples 5 to 10 and Comparative Example 3 were left to stand at 75° C. for 5000 hours with the backlight on. The voltage holding ratio and contrast of the liquid crystal display devices were measured before and after the liquid crystal display devices were left standing. Table 2 shows the results.

TABLE 2

|  | m | n | Before left standing | | After left standing | |
|---|---|---|---|---|---|---|
|  |  |  | Voltage holding ratio (%) | Contrast | Voltage holding ratio (%) | Contrast |
| Example 5 | 0.10 | 0 | 99.5 | 1500 | 93.5 | 950 |
| Example 6 | 0.10 | 1 | 99.5 | 1500 | 98.5 | 1350 |
| Example 7 | 0.10 | 2 | 99.5 | 1500 | 99.5 | 1500 |
| Example 8 | 0.10 | 3 | 99.5 | 1500 | 99.5 | 1500 |
| Example 9 | 0.10 | 4 | 99.5 | 1500 | 99.5 | 1500 |
| Example 10 | 0.10 | 5 | 99.5 | 1500 | 99.5 | 1500 |
| Comparative example 3 | 0 | — | 99.5 | 1500 | 86.5 | 800 |

Table 2 shows that Examples 5 to 10 maintained a high voltage holding ratio for extended periods. Examples 7 to 10 were particularly excellent with no decrease in voltage holding ratio and contrast after left standing. An increase in n resulted in a smaller decrease in voltage holding ratio and contrast after left standing. This is probably because an increase in n results in a longer distance of the benzotriazole group from the polymer main chain, higher mobility of the benzotriazole group, and consequently more effective formation of a complex between the benzotriazole group and copper ions, thus sufficiently suppressing a redox reaction.

By contrast, the voltage holding ratio and the contrast after left standing in Comparative Example 3 decreased greatly. This is probably because the polymer in the alignment film had no benzotriazole group, radicals were formed by a redox reaction between copper ions and the carboxylic acid (carboxy group) in the poly(amic acid), and consequently ions were formed from the radicals in the liquid crystal layer.

Example 11

A liquid crystal display device was produced by the following method.

(a) Preparation of Substrate

A thin-film transistor array substrate with the structure illustrated in FIG. 2 was prepared as the lower substrate 2. The gate electrode 9, the source electrode 10, and the drain electrode 11 were electrodes containing copper. The pixel electrode 15 was an ITO electrode. The upper substrate 3 was a substrate with a common electrode and a rib. The common electrode was an ITO electrode.

(b) Preparation of Aligning Agent

An aligning agent containing a poly(amic acid) as a solid component was produced by the following processes.

(Processes 1 to 5)

A diamine monomer represented by the chemical formula (J-12) was produced in the same manner as in the processes 1 to 5 in Example 1.

(Process 6)

An acid anhydride represented by the following chemical formula (K) was added to a γ-butyrolactone solution containing the diamine monomer represented by the following chemical formula (J-12) produced in the process 5 and a diamine with a vertical alignment functional group represented by the following chemical formula (Q). The solution was allowed to react at 60° C. for 12 hours, thereby producing a poly(amic acid) represented by the following chemical formula (3).

[Chem. 29]

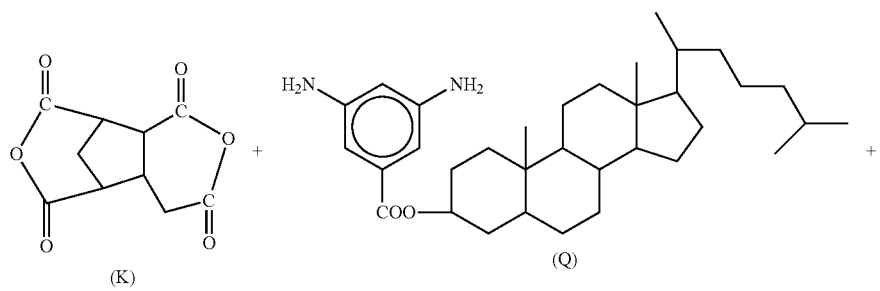

(K)  (Q)

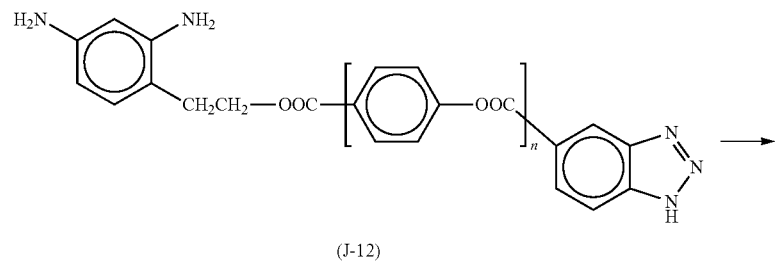

(J-12)

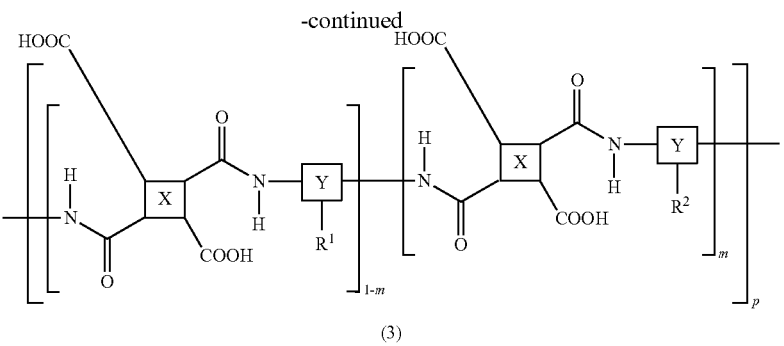

(3)

In the chemical formula (3), X is represented by the following chemical formula (4-1).

[Chem. 30]

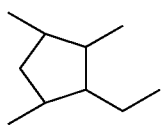

(4-1)

In the chemical formula (3), the combined structure of Y and $R^1$ is represented by the following chemical formula (R). The structure represented by the following chemical formula (R) corresponds to the combined structure of the chemical formula (5-1) and the chemical formula (D-1).

[Chem. 31]

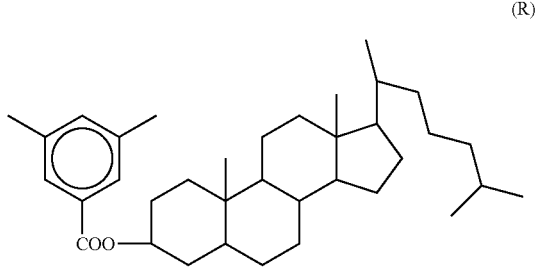

(R)

In the chemical formula (3), the combined structure of Y and $R^2$ is represented by the following chemical formula (N).

[Chem. 32]

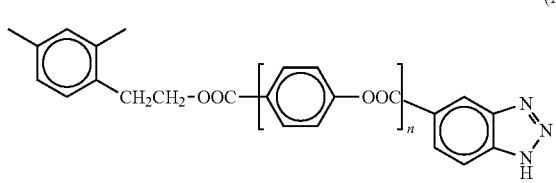

(N)

In the present example, n in the chemical formula (N) was 0. More specifically, the processes 4, 5, and 6 were successively performed using a carboxylic acid compound represented by the chemical formula (J-6) with n=0, that is, benzotriazole-5-carboxylic acid represented by the chemical formula (J-2).

In the present example, m in the chemical formula (3) was 0.10. More specifically, the amount of each material in the process 6 was as follows:

a diamine monomer represented by the chemical formula (J-12): 0.010 mol, a diamine with a vertical alignment functional group represented by the chemical formula (Q): 0.090 mol, and an acid anhydride represented by the chemical formula (K): 0.10 mol.

An aligning agent containing a poly(amic acid) as a solid component was produced in this way. The solid content was 6% by weight, and the solvent was a mixed solvent of NMP, butyl cellosolve, and γ-butyrolactone.

(c) Formation of Alignment Film

The aligning agent produced in (b) was applied to the lower substrate 2 and the upper substrate 3. The substrates to which the aligning agent was applied were heated at 90° C. for 5 minutes and were calcined to evaporate the solvent of the aligning agent. The calcined substrates were baked at 200° C. for 40 minutes. The baking caused the imidization of the poly(amic acid) and thereby formed a polyimide. The polyimide thus formed had a weight-average molecular weight of 30000 and a molecular weight distribution of 2.5. The imidization rate was 50% or more. Vertical alignment films (the alignment film 4a and the alignment film 4b) were formed on the lower substrate 2 and the upper substrate 3 in this way. The vertical alignment films had a thickness of 100 nm (after baking).

The poly(amic acid) was able to be imidized by a method different from the method of the present example. More specifically, a solution of the poly(amic acid) in γ-butyrolactone, 0.5 mol of pyridine, and 0.3 mol of acetic anhydride were allowed to react at 150° C. for 3 hours. The polyimide thus formed had a weight-average molecular weight of 30000 and a molecular weight distribution of 2.5. The imidization rate was 80% or more.

(d) Completion of Liquid Crystal Display Device

A negative liquid crystal (anisotropy of dielectric constant Δε: −3.0) was dropped on the lower substrate 2 at a predetermined position as a material for the liquid crystal layer 5. An ultraviolet-curable sealing material manufactured by Sekisui Chemical Co., Ltd. (product name: Photolec S-WB) was applied as the sealing material 6 to the upper substrate with a dispenser. The substrates were bonded together under vacuum. The sealing material 6 was cured by ultraviolet light irradiation while the display area was shaded. A realignment treatment for converting the liquid crystal layer 5 into an isotropic phase was then performed at 130° C. for 40 minutes. After cooling to 20° C., a backlight was placed on the lower substrate 2 opposite the liquid crystal layer 5 to produce a liquid crystal display device of an MVA mode with a vertical alignment film.

Example 12

A liquid crystal display device was produced in the same manner as in Example 11 except that n in the chemical formula (N) was changed.

n in the chemical formula (N) was 1. More specifically, the processes 1 and 2 were performed once in the process 3 to produce a carboxylic acid compound represented by the chemical formula (J-6) with n=1. The processes 4, 5, and 6 were then successively performed.

Example 13

A liquid crystal display device was produced in the same manner as in Example 11 except that n in the chemical formula (N) was changed.

n in the chemical formula (N) was 2. More specifically, the processes 1 and 2 were (alternately) performed two times in the process 3 to produce a carboxylic acid compound represented by the chemical formula (J-6) with n=2. The processes 4, 5, and 6 were then successively performed.

Example 14

A liquid crystal display device was produced in the same manner as in Example 11 except that n in the chemical formula (N) was changed.

n in the chemical formula (N) was 3. More specifically, the processes 1 and 2 were (alternately) performed three times in the process 3 to produce a carboxylic acid compound represented by the chemical formula (J-6) with n=3. The processes 4, 5, and 6 were then successively performed.

Example 15

A liquid crystal display device was produced in the same manner as in Example 11 except that n in the chemical formula (N) was changed.

n in the chemical formula (N) was 4. More specifically, the processes 1 and 2 were (alternately) performed four times in the process 3 to produce a carboxylic acid compound represented by the chemical formula (J-6) with n=4. The processes 4, 5, and 6 were then successively performed.

Example 16

A liquid crystal display device was produced in the same manner as in Example 11 except that n in the chemical formula (N) was changed.

n in the chemical formula (N) was 5. More specifically, the processes 1 and 2 were (alternately) performed five times in the process 3 to produce a carboxylic acid compound represented by the chemical formula (J-6) with n=5. The processes 4, 5, and 6 were then successively performed.

Comparative Example 4

A liquid crystal display device was produced in the same manner as in Example 11 except that m in the chemical formula (3) was changed.

m in the chemical formula (3) was 0. More specifically, the amount of each material in the process 6 was as follows:

a diamine monomer represented by the chemical formula (J-12): 0 mol (no addition),
a diamine with a vertical alignment functional group represented by the chemical formula (Q): 0.10 mol, and
an acid anhydride represented by the chemical formula (K): 0.10 mol.

Thus, in the liquid crystal display device according to Comparative Example 4, the polymer in the alignment film had no benzotriazole group.

[Evaluation Test 3]

In the same manner as in the evaluation test 1, the liquid crystal display devices according to Examples 11 to 16 and Comparative Example 4 were left to stand at 75° C. for 5000 hours with the backlight on. The voltage holding ratio and contrast of the liquid crystal display devices were measured before and after the liquid crystal display devices were left standing. Table 3 shows the results.

TABLE 3

| | | | Before left standing | | After left standing | |
|---|---|---|---|---|---|---|
| | m | n | Voltage holding ratio (%) | Contrast | Voltage holding ratio (%) | Contrast |
| Example 11 | 0.10 | 0 | 99.5 | 4000 | 91.5 | 1000 |
| Example 12 | 0.10 | 1 | 99.5 | 4000 | 94.5 | 3500 |
| Example 13 | 0.10 | 2 | 99.5 | 4000 | 97.5 | 3700 |
| Example 14 | 0.10 | 3 | 99.5 | 4000 | 98.5 | 4000 |
| Example 15 | 0.10 | 4 | 99.5 | 4000 | 99.5 | 4000 |
| Example 16 | 0.10 | 5 | 99.5 | 4000 | 99.5 | 4000 |
| Comparative example 4 | 0 | — | 99.5 | 4000 | 89.0 | 900 |

Table 3 shows that Examples 11 to 16 maintained a high voltage holding ratio for extended periods. Examples 14 to 16 were more excellent with little decrease in voltage holding ratio and with no decrease in contrast after left standing. Examples 15 and 16 were particularly excellent with no decrease in voltage holding ratio and contrast after left standing. An increase in n resulted in a smaller decrease in voltage holding ratio and contrast after left standing. This is probably because an increase in n results in a longer distance of the benzotriazole group from the polymer main chain, higher mobility of the benzotriazole group, and consequently more effective formation of a complex between the benzotriazole group and copper ions, thus sufficiently suppressing a redox reaction.

Comparisons of the examples with the same n, that is, Examples 11 and 5 (n=0), Examples 12 and 6 (n=1), and Examples 13 and 7 (n=2) showed that the decrease in voltage holding ratio and contrast after left standing was smaller with the horizontal (photo-)alignment films (Examples 5 to 7) than with the vertical alignment films (Examples 11 to 13). The results show that a complex between the benzotriazole group and copper ions is more easily formed using a horizontal alignment film than using a vertical alignment film.

By contrast, the voltage holding ratio and the contrast after left standing in Comparative Example 4 decreased greatly. This is probably because the polymer in the alignment film had no benzotriazole group, radicals were formed by a redox reaction between copper ions and the carboxylic acid (carboxy group) in the poly(amic acid), and consequently ions were formed from the radicals in the liquid crystal layer.

Example 17

A liquid crystal display device was produced by the following method.

(a) Preparation of Substrate

A thin-film transistor array substrate with the structure illustrated in FIG. 2 was prepared as the lower substrate 2. The gate electrode 9, the source electrode 10, and the drain electrode 11 were electrodes containing copper. The pixel electrode 15 was an ITO electrode. The upper substrate 3 was a substrate with a common electrode. The common electrode was an ITO electrode.

(b) Preparation of Aligning Agent

An aligning agent containing a polysiloxane represented by the following chemical formula (6) as a solid component was produced. The polysiloxane was produced by synthesizing a base polymer by a ring-opening polymerization followed by forming each side chain by chemical bonding. The solid content was 6% by weight, and the solvent was a mixed solvent of NMP, butyl cellosolve, and γ-butyrolactone.

[Chem. 33]

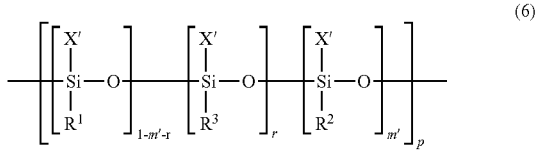

(6)

In the chemical formula (6), X' denotes a methoxy group.

In the chemical formula (6), $R^1$ is the same or different and is represented by the following chemical formula (E-24) or (E-25).

[Chem. 34]

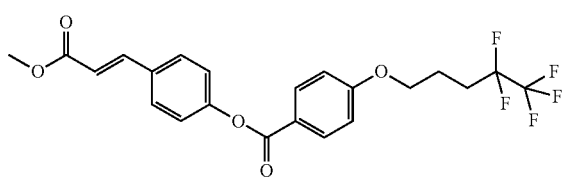

(E-24)

(E-25)

In the chemical formula (6), $R^2$ is represented by the following chemical formula (S).

[Chem. 35]

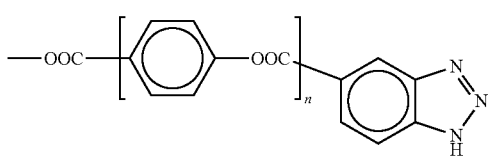

(S)

In the chemical formula (6), $R^3$ is represented b the following chemical formula (G).

[Chem. 36]

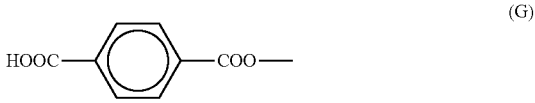

(G)

In the present example, m' in the chemical formula (6) was 0.10, and r was 0.20. More specifically, a side chain was formed on the polysiloxane base polymer, and the numbers of side chains per one repeating unit (monomer unit) in the chemical formula (6) were as follows:

the molar concentration of a component corresponding to m': 10 mol %, the molar concentration of a component corresponding to r: 20 mol %, and the molar concentration of a component corresponding to the other (1−m'−r): 70 mol %.

In the present example, n in the chemical formula (S) was 0. More specifically, benzotriazole-5-carboxylic acid represented by the chemical formula (J-2) was formed on the polysiloxane base polymer as a side chain.

(c) Formation of Alignment Film

The aligning agent produced in (b) was applied to the lower substrate 2 and the upper substrate 2. The substrates to which the aligning agent was applied were heated at 90° C., for 5 minutes and were calcined to evaporate the solvent of the aligning agent. The calcined substrates were then baked at 230° C. for 40 minutes. Subsequently, the surfaces of the substrates were subjected to photo-alignment treatment by irradiating the surfaces with linearly polarized ultraviolet light with a dominant wavelength of 330 nm at an intensity of 50 mJ/cm² and were subjected to photo-alignment treatment four times such that the pretilt angle was approximately 88.6 degrees. Vertical photo-alignment films (the alignment film 4a and the alignment film 4b) were formed on the lower substrate 2 and the upper substrate 3 in this way. The vertical photo-alignment films had a thickness of 100 nm (after baking).

(d) Completion of Liquid Crystal Display Device

A negative liquid crystal (anisotropy of dielectric constant Δε: −3.0) was dropped on the lower substrate 2 at a predetermined position as a material for the liquid crystal layer 5. An ultraviolet-curable sealing material manufactured by Sekisui Chemical Co. Ltd. (product name: Photolec S-WB) was applied as the sealing material 6 to the upper substrate 3 with a dispenser. The substrates were bonded together under vacuum such that the polarization directions of linearly polarized ultraviolet light emitted were parallel to each other. The sealing material 6 was cured by ultraviolet light irradiation while the display area was shaded. A realignment treatment for converting the liquid crystal layer 5 into an isotropic phase was the performed at 130° C. for 40 minutes. After cooling to 20° C., a backlight was placed on the lower substrate 2 opposite the crystal layer 5 to produce a liquid crystal display device of a UV2A mode with a vertical photo-alignment film.

Example 18

A liquid crystal display device was produced in the same manner as in Example 17 except that n in the chemical formula (S) was changed.

n in the chemical formula (S) was 1. More specifically, the processes 1 and 2 of Example 1 were performed once in the process 3 to form a carboxylic acid compound represented by the chemical formula (J-6) with n=1 as a side chain on the polysiloxane base polymer.

Example 19

A liquid crystal display device was produced in the same manner as in Example 17 except that n in the chemical formula (S) was changed.

n in the chemical formula (S) was 2. More specifically, the processes 1 and 2 of Example 1 were (alternately) performed two times in the process 3 to form a carboxylic acid compound represented by the chemical formula (J-6) with n=2 as a side chain on the polysiloxane base polymer.

Example 20

A liquid crystal display device was produced in the same manner as in Example 17 except that n in the chemical formula (S) was changed.

n in the chemical formula (S) was 3. More specifically, the processes 1 and 2 of Example 1 were (alternately) performed three times in the process 3 to form a carboxylic acid compound represented by the chemical formula (J-6) with n=3 as a side chain on the polysiloxane base polymer.

Example 21

A liquid crystal display device was produced in the same manner as in Example 17 except that n in the chemical formula (S) was changed.

n in the chemical formula (S) was 4. More specifically, the processes 1 and 2 of Example 1 were (alternately) performed four times in the process 3 to form a carboxylic acid compound represented by the chemical formula (J-6) with n=4 as a side chain on the polysiloxane base polymer.

Example 22

A liquid crystal splay device was produced in the same manner as in Example 17 except that n in the chemical formula (S) was changed.

n in the chemical formula (S) was 5. More specifically, the processes 1 and 2 of Example 1 were (alternately) performed five times in the process 3 to form a carboxylic acid compound represented by the chemical formula (J-6) with n=5 as a side chain on the polysiloxane base polymer.

Comparative Example 5

A liquid crystal display device was produced in the same manner as in Example 17 except that m' in the chemical formula (6) was changed.

m' in the chemical formula (6) was 0. More specifically, a side chain was formed on the polysiloxane base polymer, and the numbers of side chains per one repeating unit (monomer unit) in the chemical formula (6) were as follows:
the molar concentration of a component corresponding to m': 0 mol % (absent),
the molar concentration of a component corresponding to r: 20 mol %, and
the molar concentration of a component corresponding to the other (1−m'−r): 80 mol %.

Thus, in the liquid crystal display device according to Comparative Example 5, the polymer in the alignment film had no benzotriazole group.

[Evaluation Test 4]

In the same manner as in the evaluation test 1, the liquid crystal display devices according to Examples 17 to 22 and Comparative Example 5 were left to stand at 75° C. for 5000 hours with the backlight on. The voltage holding ratio and contrast of the liquid crystal display devices were measured before and after the liquid crystal display devices were left standing. Table 4 shows the results.

TABLE 4

| | | | Before left standing | | After left standing | |
|---|---|---|---|---|---|---|
| | m' | n | Voltage holding ratio (%) | Contrast | Voltage holding ratio (%) | Contrast |
| Example 17 | 0.10 | 0 | 99.5 | 5000 | 87.0 | 1200 |
| Example 18 | 0.10 | 1 | 99.5 | 5000 | 89.8 | 2300 |
| Example 19 | 0.10 | 2 | 99.5 | 5000 | 93.6 | 3000 |
| Example 20 | 0.10 | 3 | 99.5 | 5000 | 96.3 | 4500 |
| Example 21 | 0.10 | 4 | 99.5 | 5000 | 98.8 | 5000 |
| Example 22 | 0.10 | 5 | 99.5 | 5000 | 99.0 | 5000 |
| Comparative example 5 | 0 | — | 99.5 | 5000 | 83.0 | 1000 |

Table 4 shows that Examples 17 to 22 maintained a high voltage holding ratio for extended periods. Examples 21 and 22 were particularly excellent with a small decrease in voltage holding ratio and with no decrease in contrast after left standing. An increase in n resulted in a smaller decrease in voltage holding ratio and contrast after left standing. This is probably because an increase in n results in a longer distance of the benzotriazole group from the polymer main chain, higher mobility of the benzotriazole group, and consequently more effective formation of a complex between the benzotriazole group and copper ions, thus sufficiently suppressing a redox reaction.

Comparisons of the examples with the same n, that is, Examples 17 and 5 (n=0), Examples 18 and 6 (n=1), and Examples 19 and 7 (n=2) showed that the decrease in voltage holding ratio and contrast after left standing was smaller with the horizontal photo-alignment films (Examples 5 to 7) than with the vertical photo-alignment films (Examples 17 to 19). The results show that a complex between the benzotriazole group and copper ions is more easily formed using a horizontal photo-alignment film than using a vertical photo-alignment film.

By contrast, the voltage holding ratio and the contrast after left standing in Comparative Example 5 decreased greatly. This is probably because the polymer in the alignment film had no benzotriazole group, radicals were formed by a redox reaction between copper ions and the carboxylic acid (carboxy group) in the poly(amic acid), and consequently ions were formed from the radicals in the liquid crystal layer.

Example 23

A liquid crystal display device was produced in the same manner as in Example 1 except that the gate electrode, the source electrode, and the drain electrode were electrodes containing aluminum.

Example 24

A liquid crystal display device was produced in the same manner as in Example 2 except that the gate electrode, the source electrode, and the drain electrode were electrodes containing aluminum.

Example 25

A liquid crystal display device was produced in the same manner as in Example 3 except that the gate electrode, the source electrode, and the drain electrode were electrodes containing aluminum.

Example 26

A liquid crystal display device was produced in the same manner as in Example 4 except that the gate electrode, the source electrode, and the drain electrode were electrodes containing aluminum.

Comparative Example 6

A liquid crystal display device was produced in the same manner as in Comparative Example 1 except that the gate electrode, the source electrode, and the drain electrode were electrodes containing aluminum.

[Evaluation Test 5]

In the same manner as in the evaluation test 1, the liquid crystal display devices according to Examples 23 to 26 and Comparative Example 6 were left to stand at 75° C. for 5000 hours with the backlight on. The voltage holding ratio and contrast of the liquid crystal display devices were measured before and after the liquid crystal display devices were left standing. Table 5 shows the results.

TABLE 5

| | | | Before left standing | | After left standing | |
|---|---|---|---|---|---|---|
| | | | Voltage holding ratio | | Voltage holding ratio | |
| | m | n | (%) | Contrast | (%) | Contrast |
| Example 23 | 0.05 | 3 | 99.5 | 1500 | 98.0 | 1200 |
| Example 24 | 0.10 | 3 | 99.5 | 1500 | 99.3 | 1450 |
| Example 25 | 0.15 | 3 | 99.5 | 1500 | 99.5 | 1500 |
| Example 26 | 0.20 | 3 | 99.5 | 1500 | 99.5 | 1500 |
| Comparative example 6 | 0 | — | 99.5 | 1500 | 97.5 | 1100 |

Table 5 shows that Examples 23 to 26 maintained a high voltage holding ratio for extended periods. Examples 25 and 26 were particularly excellent with no decrease in voltage holding ratio and contrast after left standing. An increase in m resulted in a smaller decrease in voltage holding ratio and contrast after left standing. This is probably because an increase in m results in an increase in benzotriazole group content and consequently more effective formation of a complex between the benzotriazole group and aluminum ions, thus sufficiently suppressing a redox reaction.

By contrast, the voltage holding ratio and the contrast after left standing in Comparative Example 6 decreased greatly. This is probably because the polymer in the alignment film had no benzotriazole group, radicals were formed by a redox reaction between aluminum ions and the carboxylic acid (carboxy group) in the poly(amic acid), and consequently ions were formed from the radicals in the crystal layer.

The results show that even in the case where the gate electrode, the source electrode, and the drain electrode were electrodes containing aluminum, the advantages of the present disclosure were obtained as in the case of electrodes containing copper.

[Supplementary Notes]

The following are examples of liquid crystal display devices according to preferred aspects of the present disclosure. These examples may be combined if necessary without departing from the gist of the present disclosure.

The chemical structure may include a structure represented by the following chemical formula (2). This enables effective utilization of the chemical structure.

[Chem. 37]

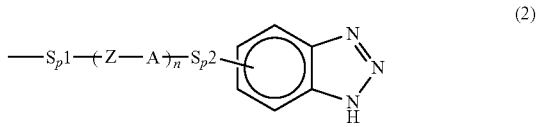

(2)

In the chemical formula (2), A denotes a 1,2-phenylene group, a 1,3-phenylene group, a 1,4-phenylene group, a naphthalene-1,4-diyl group, a naphthalene-1,5-diyl group, a naphthalene-2,6-diyl group, a 1,4-cyclohexylene group, a 1,4-cyclohexenylene group, a 1,4-bicyclo[2,2,2]octylene group, a piperidine-1,4-diyl group, a decahydronaphthalene-2,6-diyl group, a 1,2,3,4-tetrahydronaphthalene-2,6-diyl group, an indan-1,3-diyl group, an indan-1,5-diyl group, an indan-2,5-diyl group, a phenanthrene-1,6-diyl group, a phenanthrene-1,8-diyl group, a phenanthrene-2,7-diyl group, or a phenanthrene-3,6-diyl group, Sp1, Sp2, and Z are the same or different and denote an —O— group, a —S— group, a —NH— group, a —CO— group, a —COO— group, an —OCO— group, an —O—COO— group, an —OCH$_2$— group, a —CH$_2$O— group, a —SCH$_2$— group, a —CH$_2$S— group, a —N(CH$_3$)— group, a —N(C$_2$H$_5$)— group, a —N(C$_3$H$_3$)— group, a —N(C$_4$H$_9$)— group, a —CF$_2$O— group, an —OCF$_2$— group, a —CF$_2$S— group, a —SCF$_2$— group, a —N(CF$_3$)— group, a —CH$_2$CH$_2$— group, a —CF$_2$CH$_2$— group, a —CH$_2$CF$_2$— group, a —CF$_2$CF$_2$— group, a —CH=CH— group, a —CF=CF— group, a —C≡C— group, a —CH=CH—COO— group, an —OCO—CH=CH— group, or a direct bond, n denotes an integer of 0 or more.

n in the chemical formula (2) may denote an integer in the range of 1 to 5. In this case, the benzotriazole group is sufficiently separated from the main chain of the polymer, has sufficiently high mobility, and can effectively form a complex with copper ions (aluminum ions). This can also sufficiently suppress a change (Δtilt) in the tilt angle of liquid crystal molecules due to the passage of electric current (voltage application).

The polymer may contain at least one selected from the group consisting of poly(amic acid), polyimide, polysiloxane, polyvinyl, polyacrylic, and polymethacrylic. This enables effective utilization of the alignment film.

The polymer may have a carboxy group. Thus, even when the polymer has a carboxy group, that is, even when the polymer contains a carboxylic acid, the present disclosure can be suitably utilized.

The polymer may have a photoreactive functional group. This enables the alignment film to function as a photo-alignment film.

The photoreactive functional group may include at least one functional group selected from the group consisting of a cinnamate group, a chalcone group, a coumarin group, an azobenzene group, and a tolane group. This enables effective utilization of the photoreactive functional group.

The alignment film may align liquid crystal molecules in the liquid crystal layer parallel to a surface of the alignment film. Thus, the alignment film can have both the function of suppressing a redox reaction and the function of a horizontal film.

The alignment film may align liquid crystal molecules in the liquid crystal layer perpendicular to a surface of the alignment film. Thus, the alignment film can have both the function of suppressing a redox reaction and the function of a vertical alignment film.

The polymer may contain a poly (amic acid) represented by the following chemical formula (3). This enables effective utilization of the poly(amic acid) as the polymer.

[Chem. 38]

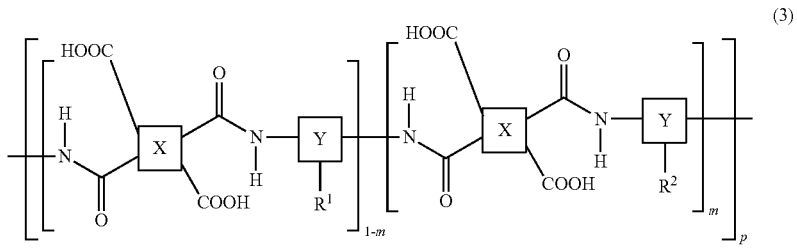

(3)

In the chemical formula (3), X is represented by the following chemical formula (4-1).

[Chem. 39]

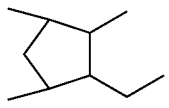

(4-1)

In the chemical formula (3), Y is represented by the following chemical formula (5-1) or (5-2).

[Chem. 40]

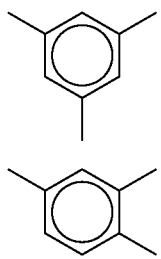

(5-1)

(5-2)

In the chemical formula (3), R denotes a horizontal alignment functional group, a vertical alignment functional group, a photoreactive functional group, or a copolymer thereof.

In the chemical formula (3), $R^2$ is represented by the following chemical formula (2).

[Chem. 41]

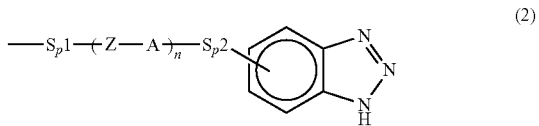

(2)

In the chemical formula (2), A denotes a 1,2-phenylene group, a 1,3-phenylene group, a 1,4-phenylene group, a naphthalene-1,4-diyl group, a naphthalene-1,5-diyl group, a naphthalene-2,6-diyl group, a 1,4-cyclohexylene group, a 1,4-cyclohexenylene group, a 1,4-bicyclo[2,2,2]octylene group, a piperidine-1,4-diyl group, a decahydronaphthalene-2,6-diyl group, a 1,2,3,4-tetrahydronaphthalene-2,6-diyl group, an indan-1,3-diyl group, an indan-1,5-diyl group, an indan-2,5-diyl group, a phenanthrene-1,6-diyl group, a phenanthrene-1,8-diyl group, a phenanthrene-2,7-diyl group, or a phenanthrene-3,6-diyl group. Sp1, Sp2, and Z are the same or different and denote an —O— group, a —S— group, a —NH— group, a —CO— group, a —COO— group, an —OCO— group, an —O—COO— group, an —OCH$_2$— group, a —CH$_2$O— group, a —SCH$_2$— group, a —CH$_2$S— group, a —N(CH$_2$)— group, a —N(C$_2$H$_5$)— group, a —N(C$_3$H$_7$)— group, a —N(C$_4$H$_9$)— group, a —CF$_2$O— group, an —OCF$_2$— group, a —CF$_2$S— group, a —SCF$_2$— group, a —N(CF$_3$)— group, a —CH$_2$CH$_2$— group, a —CF$_2$CH$_2$— group, a —CH$_2$CF$_2$— group, a —CF$_2$CF$_2$— group, a —CH=CH— group, a —CF=CF— group, a —C≡C— group, a —CH=CH—COO— group, an —OCO—CH=CH— croup, or a direct bond. n denotes an integer of 0 or more.

In the chemical formula (3), m is more than 0 and less than 1. p denotes an integer of 1 or more.

The polymer may contain a polysiloxane represented by the following chemical formula (6). This enables effective utilization of the polysiloxane as the polymer.

[Chem. 42]

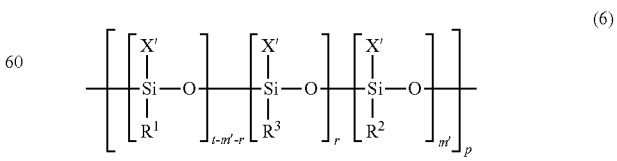

(6)

In the chemical formula (6), X' denotes —H, —OH, a methoxy group, or an ethoxy group.

In the chemical formula (6), $R^1$ denotes a horizontal alignment functional group, a vertical alignment functional group, a photoreactive functional group, or a copolymer thereof.

In the chemical formula (6), $R^2$ is represented by the following chemical formula (2).

[Chem. 43]

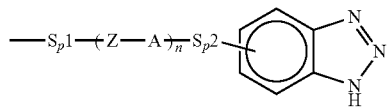

(2)

In the chemical formula (2), A denotes a 1,2-phenylene group, a 1,3-phenylene group, a 1,4-phenylene group, a naphthalene-1,4-diyl group, a naphthalene-1,5-diyl group, a naphthalene-2,6-diyl group, a 1,4-cyclohexylene group, a 1,4-cyclohexenylene group, a 1,4-bicyclo[2,2,2]octylene group, a piperidine-1,4-diyl group, a decahydronaphthalene-2,6-diyl group, a 1,2,3,4-tetrahydronaphthalene-2,6-diyl group, an indan-1,3-diyl group, an indan-1,5-diyl group, an indan-2,5-diyl group, a phenanthrene-1,6-diyl group, a phenanthrene-1,8-diyl group, a phenanthrene-2,7-diyl group, or a phenanthrene-3,6-diyl group. Sp1, Sp2, and Z are the same or different and denote an —O— group, a —S— group, a —NH— group, a —CO— group, a —COO— group, an —OCO— group, an —O—COO— group, an —OCH$_2$— group, a —CH$_2$O— group, a —SCH$_2$— group, a —CH$_2$S— group, a —N(CH$_3$)— group, a —N(C$_2$H$_5$)— group, a —N(C$_3$H$_7$)— group, a —N(C$_4$H$_9$)— group, a —CF$_2$O— group, an —OCF$_2$— group, a —CF$_2$S— group, a —SCF$_2$— group, a —N(CF$_3$)— group, a —CH$_2$CH$_2$— group, a —CF$_2$CH$_2$— group, a —CH$_2$CF$_2$— group, a —CF$_2$CF$_2$— group, a —CH=CH— group, a —CF=CF— group, a —C≡C— group, a CH=CH—COO— group, an —OCO—CH=CH— group, or a direct bond. n denotes an integer of 0 or more.

In the chemical formula (6), $R^3$ denotes a functional group with a terminal carboxy group.

In the chemical formula (6), m' and r are more than 0 and less than 1 and satisfy m'+r<1. p denotes an integer of 1 or more.

The electrode and/or wire containing copper or aluminum may be in direct contact with the alignment film. Thus, even when the electrode and/or wire containing copper or aluminum is in direct contact with the alignment film, the present disclosure can be suitably utilized.

The electrode containing copper or aluminum may include at least one selected from the group consisting of a gate electrode, a source electrode, and a drain electrode of a thin-film transistor device. Thus, even when at least one of the gate electrode, the source electrode, and the drain electrode is the electrode containing copper or aluminum, the present disclosure can be suitably utilized.

Liquid crystal molecules in the liquid crystal layer may have negative dielectric constant anisotropy. Although the liquid crystal layer more easily absorbs water and copper ions (aluminum ions) than the fold crystal layer containing liquid crystal molecules with positive dielectric constant anisotropy, the present disclosure can be suitably utilized even in this case.

The liquid crystal display device may have a display mode of IPS, FFS, TN, MVA, or UV2A. Thus, even when the liquid crystal display device has a display mode of IPS, FFS, TN, MVA, or UV2A, the present disclosure can be suitably utilized.

Although liquid crystal display devices according to preferred aspects of the present disclosure have been described above, those related to the characteristics of an alignment film are also examples of an alignment film according to a preferred aspect of the present disclosure.

REFERENCE SIGNS LIST 1 liquid crystal display device
2 lower substrate
3 upper substrate
4a, 4b alignment film
5 liquid crystal layer
6 sealing material
7 transparent substrate
8 thin-film transistor device
9 gate electrode (gate bus line)
10 source electrode (source bus line)
11 drain electrode
12 semiconductor layer
13 gate-insulating film
14a, 14b interlayer insulating film
15 pixel electrode
16 contact hole
17 lower electrode
18 upper electrode

The invention claimed is:

1. A liquid crystal display device comprising:
a pair of opposing substrates;
a liquid crystal layer disposed between the pair of substrates; and
an alignment film disposed between at least one of the pair of substrates and the liquid crystal layer,
wherein at least one of the pair of substrates has an electrode and/or a wire containing copper or aluminum, in direct contact with the alignment film, and
the alignment film contains a polymer with a chemical structure on a side chain of the polymer, the chemical structure having a benzotriazole group represented by the following chemical formula (1):

[Chem. 1]

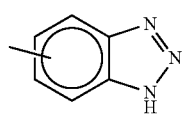

(1)

wherein the chemical structure having a benzotriazole group includes a structure represented by the following chemical formula (2):

[Chem. 2]

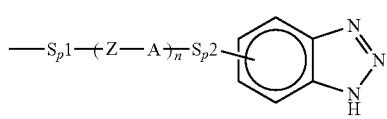

(2)

wherein A denotes a 1,2-phenylene group, a 1,3-phenylene group, a 1,4-phenylene group, a naphthalene-1,4-diyl group, a naphthalene-1,5-diyl group, a naphtha- 9. The liquid crystal display device according to claim 1, wherein the polymer contains a poly(amic acid) represented by the following chemical formula (3):

[Chem. 3]

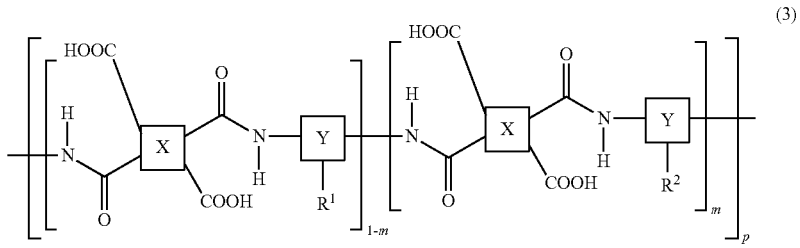

(3)

lene-2,6-diyl group, a 1,4-cyclohexylene group, a 1,4-cyclohexenylene group, a 1,4-bicyclo[2,2,2]octylene group, a piperidine-1,4-diyl group, a decahydronaphthalene-2,6-diyl group, a 1,2,3,4-tetrahydronaphthalene-2,6-diyl group, an indan-1,3-diyl group, an indan-1,5-diyl group, an indan-2,5-diyl group, a phenanthrene-1,6-diyl group, a phenanthrene-1,8-diyl group, a phenanthrene-2,7-diyl group, or a phenanthrene-3,6-diyl group, Sp1, Sp2, and Z are the same or different and denote an —O— group, a —S— group, a —NH— group, a —CO— group, a —COO— group, an —OCO— group, an —O—COO— group, an —OCH$_2$— group, a —CH$_2$O— group, a —SCH$_2$— group, a —CH$_2$S— group, a —N(CH$_3$)— group, a —N(C$_2$H$_5$)— group, a —N(C$_3$H$_7$)— group, a —N(C$_4$H$_9$)— group, a —CF$_2$O— group, an —OCF$_2$— group, a —CF$_2$S— group, a —SCF$_2$— group, a —N(CF$_3$)— group, a —CH$_2$CH$_2$— group, a —CF$_2$CH$_2$— group, a —CH$_2$CF$_2$— group, a —CF$_2$CF$_2$— group, a —CH=CH— group, a —CF=CF— group, a —C≡C— group, a —CH=CH—COO— group, an —OCO—CH=CH— group, or a direct bond, and n denotes an integer of 1 or more.

2. The liquid crystal display device according to claim 1, wherein n in the chemical formula (2) denotes an integer in the range of 1 to 5.

3. The liquid crystal display device according to claim 1, wherein the polymer contains at least one selected from the group consisting of poly(amic acid), polyimide, polysiloxane, polyvinyl, polyacrylic, and polymethacrylic.

4. The liquid crystal display device according to claim 1, wherein the polymer has a carboxy group.

5. The liquid crystal display device according to claim 1, wherein the polymer has a photoreactive functional group.

6. The liquid crystal display device according to claim 5, wherein the photoreactive functional group includes at least one functional group selected from the group consisting of a cinnamate group, a chalcone group, a coumarin group, an azobenzene group, and a tolane group.

7. The liquid crystal display device according to claim 1, wherein the alignment film aligns liquid crystal molecules in the liquid crystal layer parallel to a surface of the alignment film.

8. The liquid crystal display device according to claim 1, wherein the alignment film aligns liquid crystal molecules in the liquid crystal layer perpendicular to a surface of the alignment film.

wherein X is represented by the following chemical formula (4-1),

[Chem. 4]

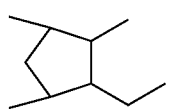

(4-1)

Y is represented by the following chemical formula (5-1) or (5-2),

[Chem. 5]

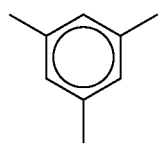

(5-1)

(5-2)

R$^1$ denotes a horizontal alignment functional group, a vertical alignment functional group, a photoreactive functional group, or a copolymer thereof, R$^2$ is represented by the following chemical formula (2),

[Chem. 6]

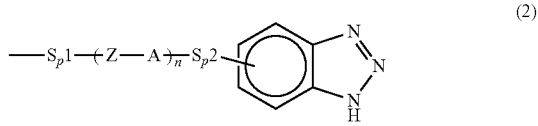

(2)

wherein A denotes a 1,2-phenylene group, a 1,3-phenylene group, a 1,4-phenylene group, a naphthalene-1,4-diyl group, a naphthalene-1,5-diyl group, a naphthalene-2,6-diyl group, a 1,4-cyclohexylene group, a 1,4-cyclohexenylene group, a 1,4-bicyclo[2,2,2]octylene group, a piperidine-1,4-diyl group, a decahydronaphthalene-2,6-diyl group, a 1,2,3,4-tetrahydronaphthalene-2,6-diyl group, an indan-1,3-diyl group, an indan-1,5-diyl group, an indan-2,5-diyl group, a phenanthrene-1,6-diyl group, a phenanthrene-1,8-diyl group, a phenanthrene-2,7-diyl group, or a phenanthrene-3,6-diyl group, Sp1, Sp2, and Z are the same or different and denote an —O— group, a —S— group, a —NH— group, a —CO— group, a —COO— group, an —OCO— group, an —O—COO— group, an —OCH$_2$— group, a —CH$_2$O— group, a —SCH$_2$— group, a —CH$_2$S— group, a —N(CH$_3$)— group, a —N(C$_2$H$_5$)— group, a —N(C$_3$H$_7$)— group, a —N(C$_4$H$_9$)— group, a —CF$_2$O— group, an —OCF$_2$— group, a —CF$_2$S— group, a —SCF$_2$— group, a —N(CF$_3$)— group, a —CH$_2$CH$_2$— group, a —CF$_2$CH$_2$— group, a —CH$_2$CF$_2$— group, a —CF$_2$CF$_2$— group, a —CH═CH— group, a —CF═CF— group, a —C≡C— group, a —CH═CH—COO— group, an —OCO—CH═CH— group, or a direct bond, and n denotes an integer of 1 or more, m is more than 0 and less than 1, and p denotes an integer of 1 or more.

10. The liquid crystal display device according to claim 1, wherein the polymer contains a polysiloxane represented by the following chemical formula (6):

[Chem. 7]

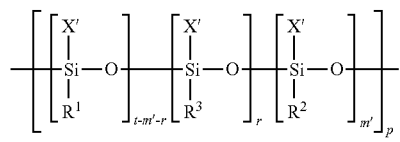

(6)

wherein X' denotes —H, —OH, a methoxy group, or an ethoxy group, R$^1$ denotes a horizontal alignment functional group, a vertical alignment functional group, a photoreactive functional group, or a copolymer thereof, R$^2$ is represented by the following chemical formula (2),

[Chem. 8]

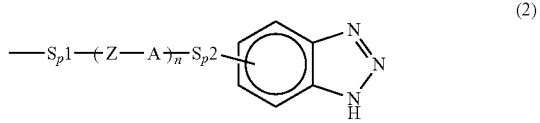

(2)

wherein A denotes a 1,2-phenylene group, a 1,3-phenylene group, a 1,4-phenylene group, a naphthalene-1,4-diyl group, a naphthalene-1,5-diyl group, a naphthalene-2,6-diyl group, a 1,4-cyclohexylene group, a 1,4-cyclohexenylene group, a 1,4-bicyclo[2,2,2]octylene group, a piperidine-1,4-diyl group, a decahydronaphthalene-2,6-diyl group, a 1,2,3,4-tetrahydronaphthalene-2,6-diyl group, an indan-1,3-diyl group, an indan-1,5-diyl group, an indan-2,5-diyl group, a phenanthrene-1,6-diyl group, a phenanthrene-1,8-diyl group, a phenanthrene-2,7-diyl group, or a phenanthrene-3,6-diyl group, Sp1, Sp2, and Z are the same or different and denote an —O— group, a —S— group, a —NH— group, a —CO— group, a —COO— group, an —OCO— group, an —O—COO— group, an —OCH$_2$— group, a —CH$_2$O— group, a —SCH$_2$— group, a —CH$_2$S— group, a —N(CH$_3$)— group, a —N(C$_2$H$_5$)— group, a —N(C$_3$H$_7$)— group, a —N(C$_4$H$_9$)— group, a —CF$_2$O— group, an —OCF$_2$— group, a —CF$_2$S— group, a —SCF$_2$— group, a —N(CF$_3$)— group, a —CH$_2$CH$_2$— group, a —CF$_2$CH$_2$— group, a —CH$_2$CF$_2$— group, a —CF$_2$CF$_2$— group, a —CH═CH— group, a —CF═CF— group, a —C≡C— group, a —CH═CH—COO— group, an —OCO—CH═CH— group, or a direct bond, and n denotes an integer of 1 or more, R$^3$ denotes a functional group with a terminal carboxy group, m' and r are more than 0 and less than 1 and satisfy m'+r<1, and p denotes an integer of 1 or more.

11. The liquid crystal display device according to claim 1, wherein the electrode containing copper or aluminum includes at least one selected from the group consisting of a gate electrode, a source electrode, and a drain electrode of a thin-film transistor device.

12. The liquid crystal display device according to claim 1, wherein liquid crystal molecules in the liquid crystal layer have negative dielectric constant anisotropy.

13. The liquid crystal display device according to claim 1, wherein the liquid crystal display device has a display mode of IPS, FFS, TN, MVA, or UV2A.

\* \* \* \* \*